United States Patent [19]

Hirai

[11] 4,131,912
[45] Dec. 26, 1978

[54] APPARATUS FOR RECORDING AND REPRODUCING VIDEO SIGNALS ON A MAGNETIC TAPE MOVABLE AT DIFFERENT SPEEDS

[75] Inventor: Jun Hirai, Yokohama, Japan
[73] Assignee: Sony Corporation, Tokyo, Japan
[21] Appl. No.: 813,187
[22] Filed: Jul. 5, 1977
[30] Foreign Application Priority Data
  Jul. 6, 1976 [JP] Japan .................................. 51-80128
[51] Int. Cl.² ............................................... H04N 5/76
[52] U.S. Cl. ......................................... 358/4; 358/127
[58] Field of Search .................................. 358/4, 8, 127
[56] References Cited
U.S. PATENT DOCUMENTS
4,007,484  2/1977  Amari ........................................ 358/8

Primary Examiner—Richard Murray
Attorney, Agent, or Firm—Lewis H. Eslinger; Alvin Sinderbrand

[57] ABSTRACT

In apparatus for recording and reproducing video signals in successive parallel tracks on a magnetic tape by means of magnetic heads or transducers repeatedly traversing the tape at a steady rate while the tape is driven longitudinally, and in which at least a portion of the video signals, for example, the luminance component of color video signals, frequency modulates a carrier to provide frequency modulated signals applied to the heads for recording in the tracks; the speed at which the tape is driven is reduced from a normal value to a relatively slow speed for eliminating guard bands between the tracks and reducing the widths of the latter so as to achieve a high recording density on the tape, and the frequency deviation of the frequency modulated signals applied to the heads is relatively reduced when the tape is driven at such slow speed during recording for minimizing the interfering signal due to cross-talk that occurs upon reproducing of the signals recorded in the tracks of reduced width without guard bands therebetween.

57 Claims, 13 Drawing Figures

APPARATUS FOR RECORDING AND REPRODUCING VIDEO SIGNALS ON A MAGNETIC TAPE MOVABLE AT DIFFERENT SPEEDS

BACKGROUND OF THE INVENTION

1. Field of the Invention

This invention relates generally to the recording and reproducing of information signals, such as, video signals, and more particularly is directed to the processing of such video or other information signals so as to eliminate or at least reduce interfering signals that appear upon reproduction of video signals recorded with a high recording density on a record medium.

2. Description of the Prior Art

It is well known to record video signals on a magnetic tape or other record medium by scanning successive parallel tracks on the record medium with one or more heads or transducers energized by the video signals. In effecting such recording of video signals, it has been the usual practice to provide guard bands or unrecorded gaps between the successive parallel tracks so that, when a transducer scans one of the tracks for reproducing the signals recorded therein, such transducer will not also reproduce cross-talk, that is, signals recorded in the adjacent tracks. However, the provision of guard bands between the successive parallel tracks reduces the recording density, that is, the amount of signal information recorded on a unit area of the record medium, and thus does not permit the efficient utilization of the record medium for the recording of video signals.

One effort made to minimize cross-talk while permitting an increase in the recording density has been to use two transducers having air gaps with different azimuth angles for recording and reproducing signals in the next adjacent or alternate tracks, respectively. This is relatively easy to do because apparatus for magnetically recording and/or reproducing video signals usually includes a rotary guide drum provided with two alternately operative transducers or heads which can have air gaps with different azimuth angles. The tape is wrapped helically about a portion of the perimeter of the crum and is moved longitudinally while the transducers or heads are rotated, thus causing the heads alternately to scan respective tracks for recording or reproducing signals therein. Each transducer or head, in the recording operation of the apparatus, effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of the track, from which it follows that the gap of the transducer or head scanning a track for reproducing the video signals recorded therein extends at an angle to the mentioned fictitious lines of the tracks next adjacent to the track being scanned. By reason of the foregoing, if a transducer or head, in scanning a track for reproducing the video signals recorded therein, overlaps an adjacent track or otherwise reproduces signals recorded in the latter, the well-known azimuth loss would result in attenuation of the signals reproduced from the adjacent track.

It is also well known that, in recording video signals as described above, it is advantageous to record at least a portion of the video signals as a frequency modulation on a carrier having a relatively high frequency. Since the previously mentioned azimuth loss is generally proportional to the frequency of the signals, such azimuth loss is relatively effective to decrease or eliminate the cross-talk from adjacent tracks in respect to the frequency modulated portion of the video signals recorded in the tracks. Thus, insofar as the frequency modulated portion of the recorded video signals is concerned, it is possible to record the video signals in abutting or even partially overlapping successive parallel tracks, that is, without providing guard bands between the adjacent tracks on the record medium.

Although the elimination of the guard bands substantially increases the recording density, any further increase in the recording density, and hence in the amount of video signal information or playing time that can be accommodated on a given length of the magnetic tape, can be achieved only by reducing the width of the successive parallel tracks. However, the degree of azimuth loss is inversely proportional to the width of the tracks. Therefore, if the width of the tracks is reduced to less than a predetermined value, the interference due to cross-talk between video signals reproduced from adjacent tracks is not eliminated or sufficiently minimized by the use of transducers or heads having different azimuth angles. It will be apparent that, if the magnitude of the cross-talk signals being reproduced by a transducer or head from tracks adjacent the track being scanned thereby is not sufficiently small in relation to the magnitude of the video signals reproduced by the head from the scanned track, an interference or beat signal with a frequency different from that of the video signals reproduced from the scanned track and the cross-talk signals will appear as a beat or moire pattern on the image of picture displayed by the cathode ray tube.

Further, it is the usual practice to record video signals with so-called H-alignment so as to avoid interference or cross-talk from the horizontal synchronizing and blanking signals included in the video signals recorded in the successive parallel tracks. In recording video signals with H-alignment, the ends of the margins between the successive areas in which line intervals are recorded in each track are aligned, in the direction transverse to the lengths of the tracks, with the adjacent ends of the margins between the successive areas in which line intervals are recorded in the next adjacent tracks. However, it is not possible to provide an apparatus in which the video signals are recorded with H-alignment when the tape is advanced at two or more different speeds. For example, if the video signals are recorded with H-alignment when the tape is longitudinally driven or transported at a predetermined normal speed, the signals will not be recorded with H-alignment when the tape is transported at a slow speed, for example, at one-half the normal speed, for increasing the recording density. In that case, the level of the interfering or noise signal due to cross-talk may become high, for example, when a head or transducer, in reproducing picture information from a track being scanned, simultaneously reproduces a horizontal synchronizing signal as cross-talk from an adajcent track, so that there is a relatively great frequency difference between the cross-talk and the video signal picture information being reproduced from the scanned track. Thus, once again, a beat or moire pattern will appear on the image or picture displayed by the cathode ray tube.

When recording color video signals which include a luminance component and a chrominance component, it is known to separate such components and then to frequency modulate the luminance component on a carrier having a relatively high frequency, while the chrominance component is frequency converted so as to have its frequency band shifted below the frequency band of the frequency modulated luminance component, whereupon the frequency modulated luminance component and the frequency converted chrominance component are combined to provide composite video signals which are recorded in the successive parallel tracks. However, since the azimuth loss is generally proportional to the frequency of the signals, as previously mentioned, interference due to cross-talk from the low frequency or frequency converted chrominance component is not reduced to the same degree by the use of transducers having different azimuth angles as cross-talk from the high frequency or frequency modulated luminance component. Thus, when recording color video signals, it has been proposed, for example, as disclosed in detail in U.S. Pat. Nos. 4,007,482 and 4,007,484, issued Feb. 8, 1977, and each having a common assignee herewith, to reduce or eliminate interference due to cross-talk between low frequency signals recorded in adjacent tracks by recording the chrominance component with different first and second carriers in such adjacent tracks, respectively. The first and second carriers modulated by the chrominance component for recording in adjacent tracks, respectively, may be distinguished from each other by their respective polarity characteristics so that, when a head scans a particular track for reproducing the video signals recorded therein, the chrominance component of cross-talk signals from the tracks next adjacent to the scanned track can be conveniently suppressed or eliminated by reason of the different polarity characteristics of the carriers with which the chrominance component was recorded in the scanned track and in the tracks adjacent thereto, respectively. Although the foregoing scheme effectively eliminates interference due to cross-talk in respect to the chrominance component while permitting a high recording density to be achieved by eliminating guard bands between the tracks and reducing the width of the latter, the previously mentioned limitations on the reduction of the width of the tracks still apply in respect to the frequency modulated luminance component of the recorded color video signals in that, as to such frequency modulated luminance component, the elimination of interference or cross-talk still depends upon the use of transducers or heads having different azimuth angles for recording the video signals in the next adjacent tracks.

Moreover, in the recording operation of existing apparatus for recording and reproducing video signals, at least a high frequency portion of the video signals, that is, the luminance component, is pre-emphasized a predetermined amount prior to the frequency modulation thereof, and, in the reproducing or playback operation of such apparatus, the reproduced frequency modulated luminance component is demodulated and then de-emphasized by an amount that is complementary to the pre-emphasis for improving the signal-to-noise ratio(S/N) of the demodulated luminance component. However, such known pre-emphasis and de-emphasis are not effective for minimizing the interference signal due to cross-talk in respect to the frequency modulated signals.

OBJECTS AND SUMMARY OF THE INVENTION

Accordingly, it is an object of this invention to provide circuits for the processing of video or other information signals in connection with the recording and reproducing thereof so as to eliminate or substantially minimize interference due to cross-talk and permit the reproduction of the original signals with high fidelity even when the signals are recorded on the record medium with a high recording density.

More particularly, it is an object of this invention to provide an apparatus with signal processing circuits for recording and/or reproducing video signals in successive parallel tracks with a high recording density achieved by elimination of guard bands between the tracks and reduction of the width of the latter while eliminating or at least substantially minimizing an interfering signal due to cross-talk when reproducing the video signals recorded in such tracks.

Another object is to provide an apparatus, as aforesaid, in which a high frequency portion of the video signals, that is, the luminance component thereof, is frequency modulated for the recording thereof, and in which the signal processing circuits are operative to substantially eliminate the interfering signal due to cross-talk while providing the reproduced signals with a relatively high signal-to-noise ratio.

A further object is to provide an apparatus, as aforesaid, in which the signal processing circuits are operative to eliminate or at least substantially minimize the interfering signals due to cross-talk even when the signals are recorded in successive parallel tracks on a record medium with a high recording density, for example, by the elimination of guard bands between the record tracks and the reduction of the width of the latter, and there is an absence of H-alignment between the signals recorded in adjacent tracks.

Still another object is to provide an apparatus, as aforesaid, for recording and reproducing color video signals in successive parallel tracks on a magnetic tape with a high recording density, in which the luminance component is recorded as a frequency modulation of a carrier having a relatively high frequency while the chrominance component is frequency converted to a band below that of the frequency modulated luminance component, and in which the processing circuits are operative to substantially eliminate from the demodulated luminance component of the reproduced signals the interfering signal due to cross-talk while reproducing the original video signals with a suitably high signal-to-noise ratio even when the signals recorded in adjacent tracks are out of H-alignment.

In accordance with an aspect of this invention, in an apparatus for recording and/or reproducing video signals in successive parallel tracks on a magnetic tape by means of a magnetic head or heads which repeatedly traverse the tape at a steady rate, while the tape may be selectively driven at either a normal tape speed or a slow or long-playing speed for increasing the recording density by eliminating guard bands between the tracks and reducing the widths of the latter, and in which at least a portion of the video signals, for example, the luminance component of color video signals, frequency modulates a carrier to provide corresponding frequency modulated signals for recording by the head or heads;

the frequency deviation of the frequency modulated signals is relatively reduced, for example, by reducing the gain and clamping level of the luminance component prior to frequency modulating the carrier therewith, upon changeover of the tape speed from the normal speed to the slow or long-playing tape speed, whereby to reduce the possible frequency difference between the frequency modulated signals reproduced from a track and the cross-talk from an adjacent track even if the signals are recorded without H-alignment due to such change-over of the tape speed.

Further, it is a feature of this invention to provide a recording and/or reproducing apparatus in which the frequency deviation of the frequency modulated signals is reduced for recording with the slow or long-playing tape speed, as aforesaid, with an arrangement by which the pre-emphasis of the video signals or portion thereof frequency modulating the carrier and the corresponding de-emphasis of the demodulated signals upon reproduction are increased upon change-over of the tape speed to such slow or long-playing speed for maintaining a suitable signal-to-noise ratio in spite of such reduction of the frequency deviation.

Moreover, in a recording and/or reproducing apparatus according to this invention, as aforesaid, the carrier of the frequency modulated portion of the video signals, as recorded in tracks that are next adjacent to each other, is preferably provided with different first and second carrier frequencies, respectively, which carrier frequencies are in frequency interleaving relation to each other so as to further reduce the interfering signal due to cross-talk, and, upon reproducing of the recorded signals, the frequency modulated portion thereof is demodulated, and changes in the level of the resulting demodulated signal corresponding to the different carrier frequencies with which the frequency modulated portion of the video signals was recorded in next adjacent tracks, respectively, are eliminated, for example, by selectively applying suitably different bias voltages to the demodulated signal.

The above, and other objects, features and advantages of this invention, will be apparent in the following detailed description of illustrative embodiments thereof which is to be read in connection with the accompanying drawings.

DESCRIPTION OF THE PREFERRED EMBODIMENTS

Figure 1:
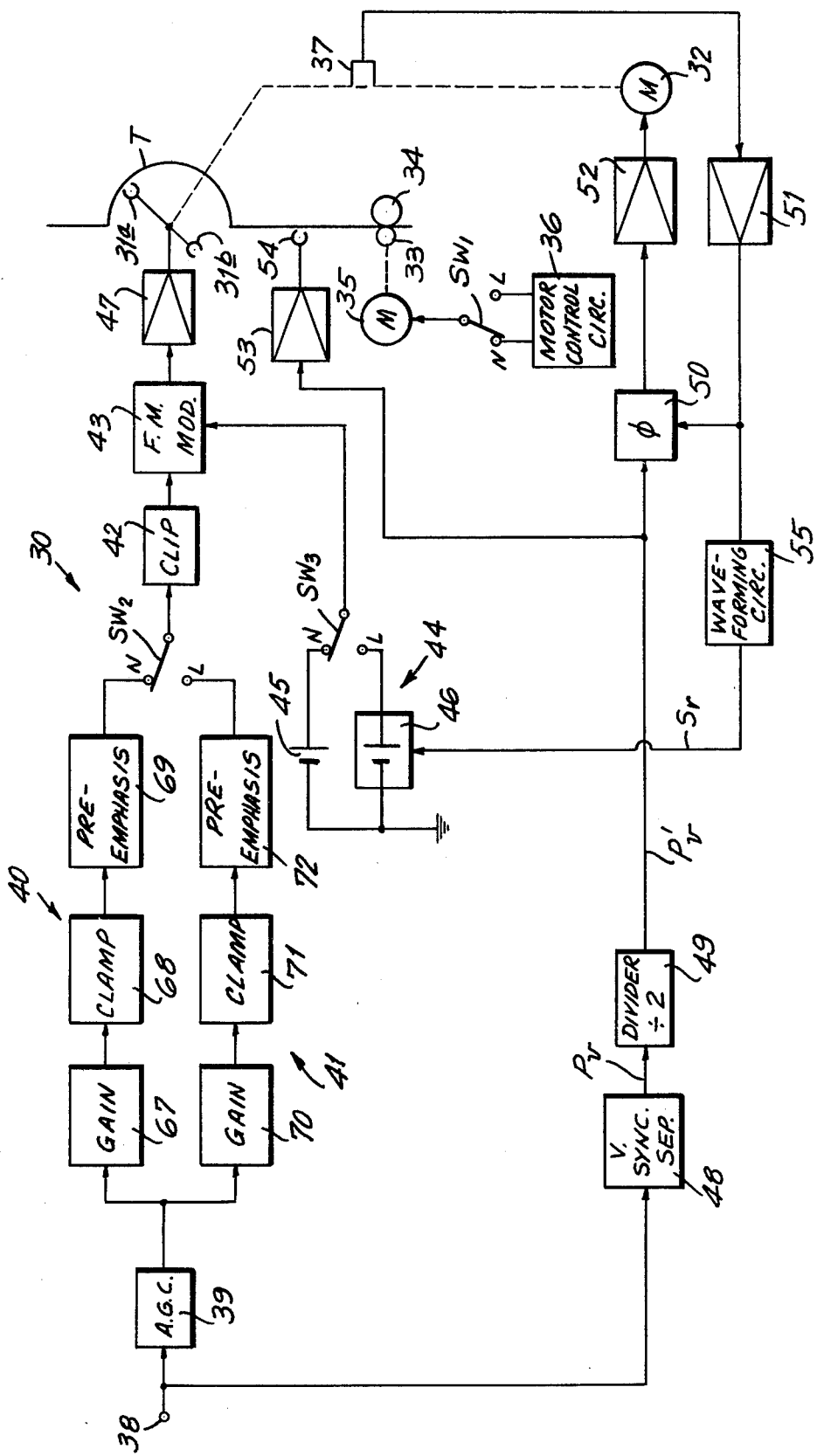
FIG. 1 is a block diagram showing a circuit for recording video signals in an apparatus according to an embodiment of this invention.
Figure 2:
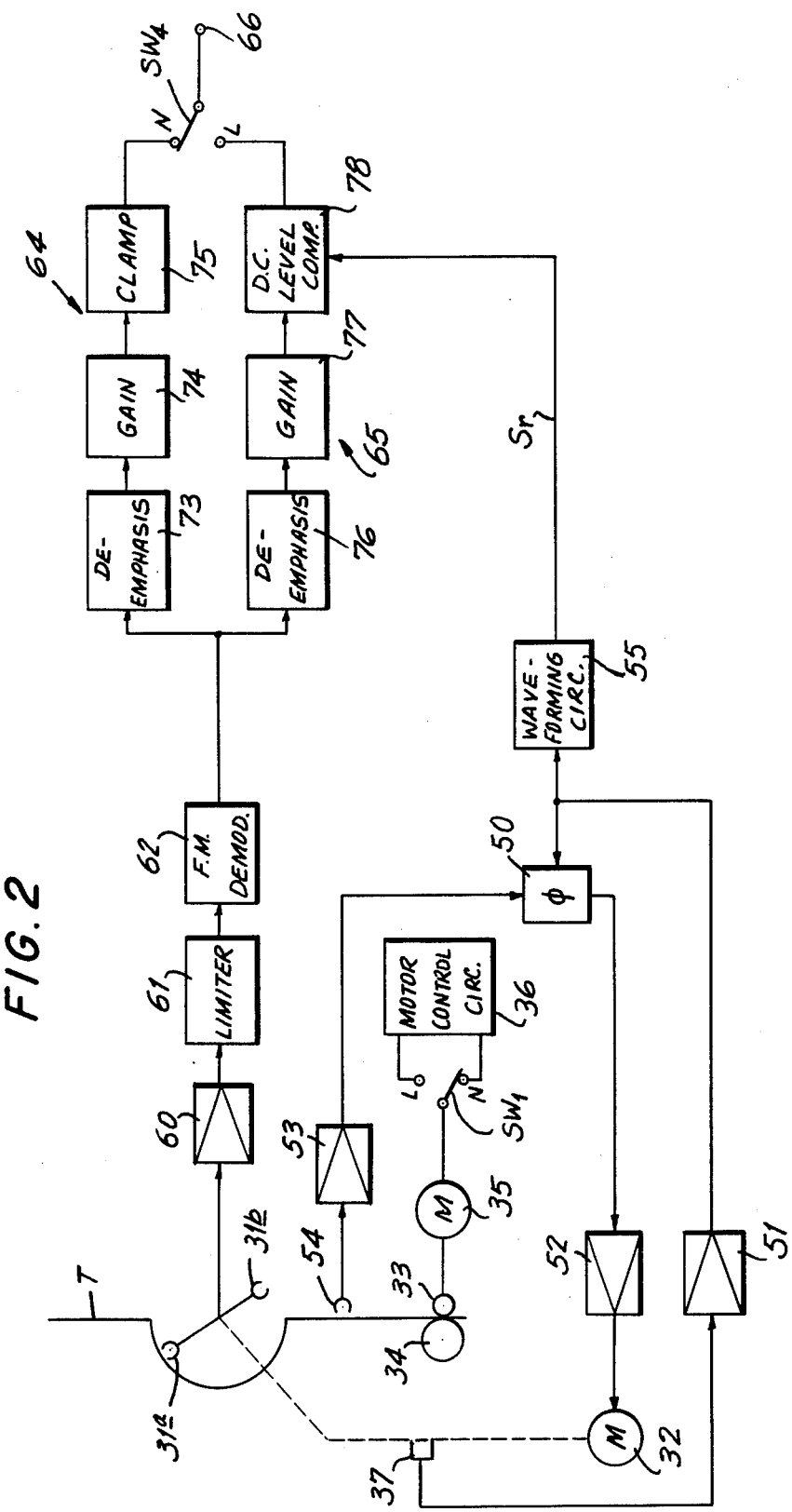
FIG. 2 is a block diagram of a circuit according to this invention for reproducing video signals which have been recorded by the circuit of FIG. 1.

Referring to the drawings in detail, and initially to FIGS. 1 and 2 thereof, it will be seen that the invention is there shown applied to a magnetic tape video signal recording and reproducing apparatus 30 of the helical scan type having a pair of diametrically opposed, rotary magnetic heads 31a and 31b rotated at the rate of 30 revolutions per second by means of a motor 32. A magnetic tape T is wrapped helically about a portion of the periphery of a guide drum (not shown) associated with heads 31a and 31b, and is driven longitudinally at a selected one of two different tape speeds by the cooperative action of a rotated capstan 33 and a pinch roller 34. A motor 35 for driving capstan 33 has its speed of operation regulated by a suitable motor control circuit 36 through a switch $SW_1$. Thus, when switch $SW_1$ is in the illustrated position engaging its contact N, the motor control signal thus applied from motor control circuit 36 to motor 35 causes the latter to drive capstan 33 at a rotational speed corresponding to a normal tape speed. On the other hand, when switch $SW_1$ is changed-over to engage its contact L, the motor control signal thus applied from circuit 36 to motor 35 causes the latter to rotate capstan 33 at a reduced speed for driving the tape at a relatively slow speed for long playing operation of the recording and reproducing apparatus. The two different tape speeds obtained when switch $SW_1$ engages its N and L contacts, respectively, are selected so that, for example, if video signals can be recorded on a predetermined length of tape T for one hour when the tape is driven at the normal speed, video signals can be recorded on such predetermined length of tape for two hours when the slow or long-playing tape speed is selected. Furthermore, in the apparatus illustrated on FIGS. 1 and 2, a rotation indicating pulse generator 37 is provided, for example, in association with the shaft 32a connecting motor 32 with heads 31a and 31b, for producing a rotation indicating pulse for each revolution of the heads, with such pulse being in a predetermined phase relation to the rotational position of heads 31a and 31b.

As shown particularly on FIG. 1, the recording circuit of apparatus 30 includes additional switches $SW_2$ and SW$_3$ which may be ganged with switch SW$_1$ so that switches SW$_2$ and SW$_3$ engage their respective contacts N, as shown, when the normal tape speed is selected, and further so that switches SW$_2$ and SW$_3$ are changed-over to engage their respective contacts L when the slow or long-playing tape speed is selected. In the recording operation of apparatus 30, black-and-white video signals, or the luminance component of color video signals, are applied to an input terminal 38, and from the latter through an automatic gain control circuit 39 to signal processing circuits 40 and 41 respectively connected to contacts N and L of switch SW$_2$, and which are hereinafter described in detail. Thus, during recording operations at the normal tape speed, the video signals are applied through signal processing circuit 40 and contact N of switch SW$_2$ to a conventional white and dark clipping circuit 42. On the other hand, during a recording operation with tape T being driven at the relatively slow or long-playing speed, the video signals are supplied through signal processing circuit 41, and through contact L of switch SW$_2$ to clipping circuit 42. In either recording mode of apparatus 30, that is, when recording with either the normal tape speed or the long-playing tape speed, the video signals, after being clipped in circuit 42, are applied to a frequency modulator 43 for frequency modulating a carrier of relatively high frequency determined by a carrier frequency control circuit generally identified by the reference numeral 44.

During recording at the normal tape speed, frequency modulator 43 is continuously supplied with a predetermined constant DC voltage from a DC voltage source 45 in circuit 44 through contact N of switch SW$_3$ so as to provide the carrier which is to be frequency modulated with a frequency determined by the value of the voltage from source 45. On the other hand, during recording with the slow or long playing tape speed, frequency modulator 43 is supplied with a variable DC voltage form a variable DC voltage source 46 in circuit 44 through contact L of switch SW$_3$, and variable DC voltage source 46 is controlled so that the level of the DC voltage applied therefrom to frequency modulator 43 will change for successive field intervals of the video signals being recorded. More particularly, and as disclosed in detail in my U.S. Patent Application Serial No. 770,315, filed Feb. 18, 1977, and having a common assignee herewith, the levels of the variable DC voltages applied from source 46 to frequency modulator 43 for successive field intervals are selected so that the corresponding carrier frequencies subject to frequency modulation in modulator 43 during the successive field intervals will differ from each other by $(m+\frac{1}{2})f_H$, for example, by $\frac{1}{2}f_H$, in which $f_H$ is the horizontal or line frequency of the video signals being recorded. The frequency modulated signal from modulator 43 is applied through a recording amplifier 47 to heads 31a and 31b which, in the illustrated apparatus 30 are intended to alternately record successive field intervals of the video signals.

In order to synchronize the rotation of heads 31a and 31b with the field intervals of the video signals applied to input terminal 38 so that each of the rotary heads will record a field interval as it scans a record track extending obliquely across tape T, a sync separating circuit 48 is connected to input terminal 38 for separating vertical synchronizing signals P$_v$ from the video signals applied to terminal 38. The separated vertical synchronizing signals P$_v$, which occur at the frequency of the field intervals, are applied to a frequency dividing circuit 49 which divides by two so as to provide a synchronizing pulse P'$_v$ at the frequency of the frame intervals. The synchronizing pulse P'$_v$ is applied to one input of a phase comparator 50, and the rotation indicating pulses from generator 37 are applied through a pulse-forming circuit 51 to another input of phase comparator 50 which, on the basis of phase deviation between the pulses received from frequency divider 49 and pulse-forming amplifier 51, suitably varies its output applied as a control voltage to a servo amplifier 52 for controlling motor 32. Thus, the rotation of heads 31a and 31b is controlled so that each head will commence its scanning obliquely across tape T at the commencement of a field interval of the video signals being recorded. The synchronizing pulse P'$_v$ is further shown to be applied through an amplifier 53 to a fixed magnetic head 54 which, in the recording operation of apparatus 30, is effective to record the synchronizing pulses P'$_v$ as track identifying control signals at suitably spaced apart locations along a longitudinal edge of tape T.

Figure 8:
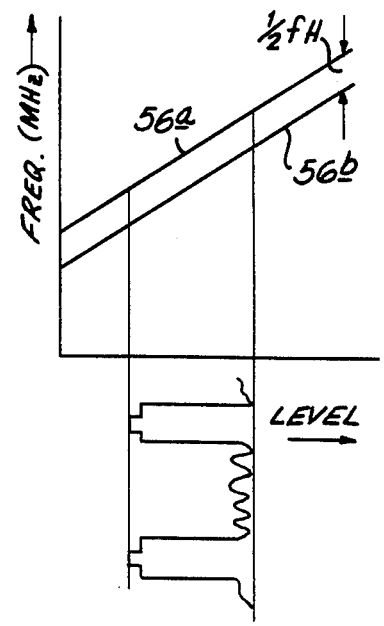
FIG. 8 is a graphic representation of the frequency modulating characteristics of a frequency moudlator included in the circuit of FIG. 1, and which has its carrier frequency shifted for successive vertical intervals of the modulating video signal.
Figure 9:
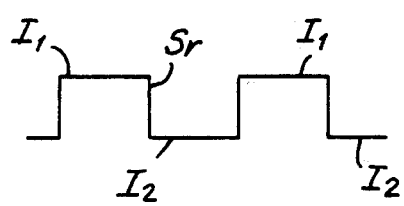
FIG. 9 shows a rectangular waveform by which the shifting of the carrier frequency of the frequency modulator is controlled.

In the recording circuit of FIG. 1, the pulses from pulse-forming circuit 51 are further shown to be applied to a waveforming circuit 55 for producing a control signal S$_r$ (FIG. 9) of rectangular waveform which is, in turn, applied to variable DC voltage source 46 for controlling the level of the voltage output therefrom. The rectangular control signal S$_r$ has a period equal to the frame interval of the video signals being recorded so that, during the alternate field intervals indicated at I$_1$ on FIG. 9, a relatively high control voltage is applied to voltage source 46, whereas, during the intervening or remaining field intervals indicated at I$_2$, a relatively low control voltage is applied to voltage source 46. Thus, during successive field intervals I$_1$ and I$_2$ of video signals being recorded with the slow or long-playing tape speed, variable DC voltage source 46 applies correspondingly high and low voltage levels to frequency modulator 43 for similarly changing the frequency of the carrier which is frequency modulated in modulator 43. Accordingly, as shown on FIG. 8, during the recording of each of the alternate field intervals I$_1$, the frequency modulation of the carrier in response to the clipped video signals applied to modulator 43 from circuit 42 may occur along the line or curve 56a, whereas, during the recording of each of the intervening field intervals I$_2$, the frequency modulation may occur along the line or curve 56b which deviates by $\frac{1}{2}f_H$ from line 56a.

Figure 6A:
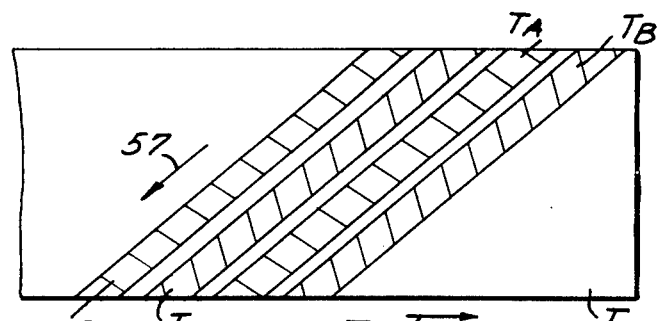
FIGS. 6A and 6B are schematic views of portions of a magnetic tape respectively showing successive parallel tracks in which video signals are recorded and reproduced by the circuits of FIGS. 1 and 2 when the magnetic tape is advanced at a relatively high or normal speed, and at a relatively slow speed for increasing the recording density and thereby increasing the playing time of the tape.

As is shown in FIG. 6A, during recording operation of apparatus 30 with the normal tape speed, heads 30a and 30b are alternately operative to record respective field intervals of the frequency-modulated video signals in respective parallel record tracks T$_A$ and T$_B$ which are alternately arranged with a predetermined track pitch so as to provide guard bands of constant width between the adjacent tracks T$_A$ and T$_B$. On the other hand, as shown on FIG. 6B, when recording with the slow or long-playing tape speed, which is, for example, one-half the normal tape speed, the track pitch is correspondingly reduced so that the successively scanned tracks overlap each other. Thus, for example, as head 30a scans a record track T$_A$ on tape T, such track overlaps the track T$_B$ previously scanned by the head 30b, as shown on FIG. 6B, with the result that the effective widths of the successive tracks T$_A$ and T$_B$ are substantially reduced and the guard bands therebetween are eliminated for providing a high recording density.

Figure 6B:
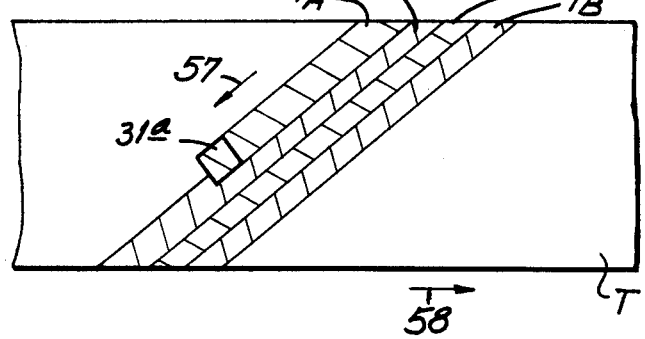

As previously mentioned, each of the tracks $T_A$ and $T_B$ preferably has recorded therein the signal information corresponding to a respective field interval of the video signals, and each track is divided into successive areas or increments each having recorded therein the signal information corresponding to a horizontal or line interval of the respective field of the video signals. Each line interval and each field interval of the video signals contains a blanking and synchronizing portion and, in accordance with accepted practice, the relative movements of the heads and the tape, as indicated by the arrows 57 and 58 on FIGS. 6A and 6B are preferably regulated in accordance with the synchronizing signals of the video signals to be recorded so as to obtain so-called H-alignment of the areas in which line intervals are recorded in each track with the areas in which line intervals are recorded in the next adjacent tracks during recording with the normal tape speed. In other words, as shown schematically on FIG. 6A, when recording at the normal tape speed, the ends of the margins between the areas in which the line intervals are recorded in each of the tracks $T_A$ are aligned, in the direction transverse to the lengths of the tracks, with the adjacent ends of such margins in the next adjacent tracks $T_B$.

Figures 4A, 4B:
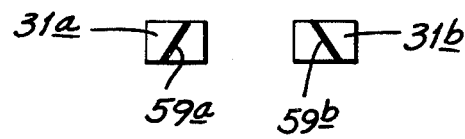
FIGS. 4A and 4B are schematic views illustrating the arrangement of the air gaps of heads or transducers employed for recording and reproducing video signals which are processed by the recording and reproducing circuits of FIGS. 1 and 2.

Further, as shown schematically on FIGS. 4A and 4B, heads 31a and 31b have air gaps 59a and 59b, respectively, arranged at substantially different azimuth angles in respect to the plane of rotation of the heads. By reason of the foregoing, each of the heads 31a and 31b, when recording video signals in the respective tracks on tape T, effects magnetization of magnetic domains in the magnetic coating on the tape in what would appear to be, if such domains were visible, a series of parallel lines or stripes extending across the respective track and each having an orientation that corresponds to the azimuth angle of the gap of the respective head 31a or 31b.

Referring now to FIG. 2, it will be seen that a number of the elements described above in connection with the recording operation of apparatus 30 are also employed in connection with the reproducing operation of such apparatus and are identified by the same reference numerals on FIG. 2. Thus, during the reproducing operation, either the normal tape speed or the relatively slow or long-playing tape speed is determined by the position of switch $SW_1$ which applies to motor 35 driving capstan 33 one or the other of the suitable motor control signals from circuit 36. During reproducing operation, fixed magnetic head 54 reproduces the successive track indicating signals recorded along a longitudinal edge of tape T and applies the same to the pulse-forming amplifier 53 which provides suitably shaped pulses to one input of phase comparator 50. Simultaneously rotation indicating pulses from generator 37 are applied through pulse-forming circuit 51 to another input of phase comparator 50 which, on the basis of a phase comparison of the pulses from circuits 51 and 53, applies a corresponding control voltage to servo amplifier 52 for controlling the rotation of motor 32 driving rotary heads 31a and 31b. Thus, the rotation of heads 31a and 31b is suitably controlled so that, during a reproducing operation with the tape moving at the same speed employed for a previous recording operation, tracks $T_A$ and $T_B$ will be accurately scanned by the same heads 31a and 31b, respectively, that were previously employed for recording frequency modulated video signals in such tracks.

The reproducing circuit of apparatus 30 is further shown to include a reproducing amplifier 60 and a limiter 61 through which the frequency modulated video signals alternately reproduced by heads 31a and 31b from successive tracks $T_A$ and $T_B$ are successively applied to a frequency demodulator 62. The demodulated output of frequency demodulator 62 is applied to reproduced signal processing circuits 64 and 65 respectively connected to contacts N and L of a switch $SW_4$. Switch $SW_4$ which may be ganged with switch $SW_1$ so as to engage its contact N, as shown, during normal reproducing, that is, during reproducing of video signals with the tape being driven at the normal speed at which such video signals were originally recorded. Thus, during normal reproducing, the demodulated output from frequency demodulator 62 is supplied by way of signal processing circuit 64 and switch $SW_4$ to an output terminal 66. On the other hand, if video signals have been recorded on tape T while the tape is moved at the slow or long-playing speed, reproducing of such signals is also effected at the slow or long-playing tape speed and, in that case, switch $SW_4$ is changed-over to engage its L contact so that the demodulated video signals from demodulator 62 are then applied to output terminal 66 through signal processing circuit 65.

As will be apparent from FIG. 6A, during the reproducing at the normal tape speed of signals recorded at such normal tape speed, the tracks $T_A$ and $T_B$ scanned by heads 31a and 31b, respectively, are of the same width as the heads so that each of the heads can be made to scan only the respective track during reproducing. By reason of the foregoing, and further by reason of the guard bands between the adjacent tracks and the different azimuth angles of the gaps 59a and 59b of heads 31a and 31b, the level of any cross-talk signals is reduced to a great extent so that interfering signals due to cross-talk are not a problem. On the other hand, as will be apparent from FIG. 6B, when recording with the slow or long-playing tape speed, the effective width of each of the tracks $T_A$ and $T_B$ that remain on tape T at the completion of the recording operation is substantially less than the width of each of the heads 31a and 31b. Therefore, when reproducing with the slow or long-playing tape speed, each of the heads 31a and 31b, when scanning and reproducing the signals recorded in a track $T_A$ or $T_B$, respectively, will also scan a portion of the width of an adjacent track $T_B$ or $T_A$, respectively, so as to also reproduce the signals recorded in the latter as a cross-talk signal. Therefore, the level of the cross-talk signal, in the case of reproducing with the slow or long-playing tape speed, is substantially increased relative to the level of the cross-talk signal in the case of reproducing with the normal tape speed. Furthermore, by reason of the reduced width of the tracks $T_A$ and $T_B$ when recording with the slow or long-playing tape speed, the different azimuth angles of the air gaps of heads 31a and 31b are of reduced effectiveness in attenuating or decreasing the level of the cross-talk signal during reproducing with the slow or long-playing tape speed. Therefore, when reproducing with the slow or long-playing tape speed, the cross-talk signal can give rise to a disturbing interfering signal if there is a substantial difference in frequency between the cross-talk signal and the signal being simultaneously reproduced from the track which is actually being scanned.

Furthermore, if the signals are recorded with H-alignment between signals recorded in adjacent tracks during recording with the normal tape speed, as shown on FIG. 6A, H-alignment cannot be obtained when recording with the slow or long-playing tape speed, as shown on FIG. 6B. By reason of the absence of H-alignment of the signals recorded with the slow or long-playing tape speed, relatively large frequency differences can occur between the signal being reproduced from a track being scanned that is, the main reproduced signal, and the cross-talk signal from an adjacent track when reproducing with the long-playing tape speed. By reason of such relatively large frequency differences and the reduced width of the tracks, the resulting relatively high level interfering signal cannot be sufficiently eliminated by the azimuth loss resulting from the different azimuth angles of the air gaps of heads 31a and 31b.

If, for example, the frequency modulated signals recorded in the successive tracks $T_A$ and $T_B$ on tape T have maximum and minimum frequencies of 4.8 MHz and 3.5 MHz corresponding to the white level and the sync tip level, respectively, of the video signals which modulate the carrier, that is, the recorded frequency modulated signals have a frequency deviation of 1.3 MHz, then, during reproducing, the maximum frequency difference that can occur between the frequencies of the main signal and the cross-talk signal simultaneously reproduced by a head is 1.3 MHz. When the signals recorded in adjacent tracks are in H-alignment, for example, as schematically illustrated in respect to tracks $T_{A1}$ and $T_{B1}$ on FIG. 7, the frequency modulated signals in track $T_{A1}$ have their portions corresponding to the horizontal sync signals $P_h$ and their intervening portions corresponding to picture or video information aligned, in the direction transverse to the length of the tracks, with the portions of the frequency modulated signals in track $T_{B1}$ respectively corresponding to the horizontal sync signals and the picture or video information. Since the horizontal sync signals and the picture or video information account for respective portions of the frequency deviation, for example, 3/10 and 7/10, respectively, of the frequency deviation, and since the portions of the frequency modulated signals representing the horizontal sync signals have substantially uniform frequencies, the maximum frequency difference between the main reproduced signal and the cross-talk signal, in the case of H-alignment, is determined by that portion of the frequency deviation resulting from the picture or video information. In other words, if the frequency deviation is 1.3 MHz and the picture or video information accounts for 7/10 thereof, or about 900 KHz, the maximum frequency difference between the main reproduced signal and the cross-talk signal is 900 KHz when the signals recorded in next adjacent tracks are in H-alignment. Such maximum frequency difference of 900 KHz could occur, for example, when the main reproduced signal represents the video information at the white level and the cross-talk signal represents video information at the black level, that is, when the signals recorded in tracks $T_{A1}$ and $T_{B1}$ correspond to a demarcation or border between white and black areas of the television picture.

Figure 7:
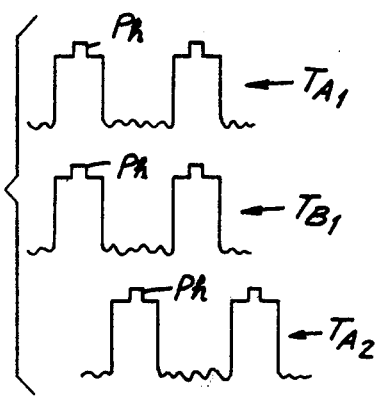
FIG. 7 schematically represents groups of video signals which are recorded as frequency modulations on a carrier in successive parallel tracks which are in and out of H-alignment.

On the other hand, if the frequency modulated signals recorded in adjacent tracks are not in H-alignment, for example, as schematically illustrated in respect to tracks $T_{B1}$ and $T_{A2}$ on FIG. 7, the main signal reproduced by head 31b when scanning track $T_{B1}$ may have a frequency, for example, of 4.8 MHz corresponding to video information at the white level, while the cross-talk signal simultaneously reproduced by head 31b from track $T_{A2}$ may have a frequency, for example, of 3.5 MHz, corresponding to the sync tip level, leading to a maximum frequency difference of 1.3 MHz between the main reproduced signal and the cross-talk signal.

In order to avoid the above problem, in the apparatus 30 according to this invention, the frequency deviation of the frequency modulated signals recorded in the successive parallel tracks is relatively reduced when recording with the slow or long-playing tape speed. Thus, even though the signals recorded in the next adjacent tracks are not in H-alignment when recording with the slow or long-playing tape speed, the maximum frequency difference between the main reproduced signal and the cross-talk signal is reduced in correspondence with the reduction in the frequency deivation. However, the described reduction of the frequency deviation of the frequency modulated signals when recording with the slow or long-playing tape speed may cause a deterioration in the signal-to-noise ratio of the frequency modulated signals and give rise to an objectionable FM noise signal mixed with the reproduced video signals. Therefore, in accordance with this invention, a relatively increased pre-emphasis is applied to the video signals prior to the frequency modulation of the carrier therewith when recording with the slow or long-playing tape speed, so as to restore an adequate signal-to-noise ratio, and a correspondingly increased de-emphasis is applied to the demodulated signals during reproducing with the slow tape speed for substantially eliminating the FM noise signal from the reproduced output.

In the apparatus 30 according to this invention, changes in the frequency deviation of the frequency modulated signals when recording with the normal tape speed and with the slow or long-playing tape speed are effected by suitably changing the level difference between the white level and the sync tip level of the video signals employed for frequency modulating the carrier in frequency modulator 43. More particularly, as shown on FIG. 1, signal processing circuit 40 through which the video signals from circuit 39 are transmitted by way of switch SW$_2$ to clipping circuit 42 during recording with the normal tape speed includes a gain control circuit 67, a clamping circuit 68 and a pre-emphasis circuit 69. Similarly, signal processing circuit 41 through which the video signals are transmitted from circuit 39 to clipping circuit 42 by way of switch SW$_2$ during recording with the slow or long-playing tape speed is shown to include a gain control circuit 70, a clamping circuit 71 and a pre-emphasis circuit 72 which have characteristics substantially different from those of gain control circuit 67, clamping circuit 68 and pre-emphasis circuit 69, respectively. If, for example, the frequency modulated signals recorded with the normal tape speed are to have a minimum frequency of 3.5 MHz and a maximum frequency of 4.8 MHz respectively corresponding to the sync tip level and the white level of the video signals applied to input terminal 38, then clamping circuit 68 is arranged to suitably clamp the sync tip levels of the incoming signals at a level which corresponds to the minimum frequency 3.5 MHz at the output of frequency modulator 43, and gain control circuit 67 is arranged so that the level difference between the sync tip level and the white level of the video signals, at the output of gain control circuit 67 will correspond to the desired frequency deviation of 1.3 MHz between the minimum and maximum frequencies of the frequency modulated signals issuing from modulator 43. Further, in signal processing circuit 40, pre-emphasis circuit 69 has a gain-frequency characteristic, for example, as indicated by the curve 69a on FIG. 5, for providing a sufficient amount of emphasis to the video signals applied to frequency modulator 43 so as to maintain an adequate signal-to-noise ratio in the output therefrom. It will be noted that the pre-emphasis of the video signals in circuit 69 produces overshoots at portions of the video signals where the level of the latter is abruptly changed, with the extent of such overshoots being dependent on the amount of emphasis provided by circuit 69. Therefore, the amount of emphasis provided by circuit 69 is limited by the requirement that the overshoots resulting therefrom, particularly at the relatively high level portions of the video signals, not be excessively clipped in the white and dark clipping circuit 42, as excessive clipping of the overshoots will result in distortion of the reproduced signals upon the demodulation thereof.

Figure 3A:
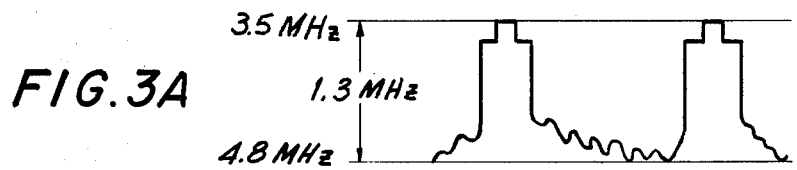
FIGS. 3A and 3B schematically illustrate the relation between video signals and the frequency deviation of frequency modulated signals when the apparatus of FIG. 1 is operated for recording with two different tape speeds, respectively.
Figure 3B:
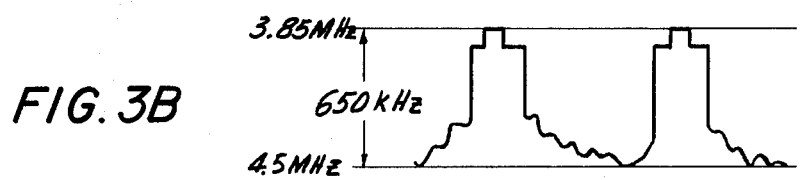

If the components of signal processing circuit 40 are arranged, as described above, for providing minimum and maximum frequencies of the frequency modulated signals at 3.5 and 4.8 MHz, respectively, resulting in a frequency deviation of 1.3 MHz for recording with the normal tape speed, signal processing circuit 41 which is operative during recording with the slow or long-playing tape speed may be arranged, for example, to provide the frequency modulated signals issuing from frequency modulator 43 with minimum and maximum frequencies of 3.85 MHz and 4.5 MHz, respectively, resulting in a frequency deviation of 650 KHz, as shown on FIG. 3B. In the case of the foregoing example, clamping circuit 71 may be arranged to clamp the sync tip levels of the video signals at a level corresponding to the minimum frequency of 3.85 MHz of the frequency modulated signals, while gain control circuit 70 is arranged so that the level difference between the sync tip level and the white level of the video signals, as applied to the input of frequency modulator 43, will result in the frequency modulated signals having a frequency deviation of 650 KHz, that is, a maximum frequency of 4.5 MHz corresponding to the white level of the video signals.

Figure 5:
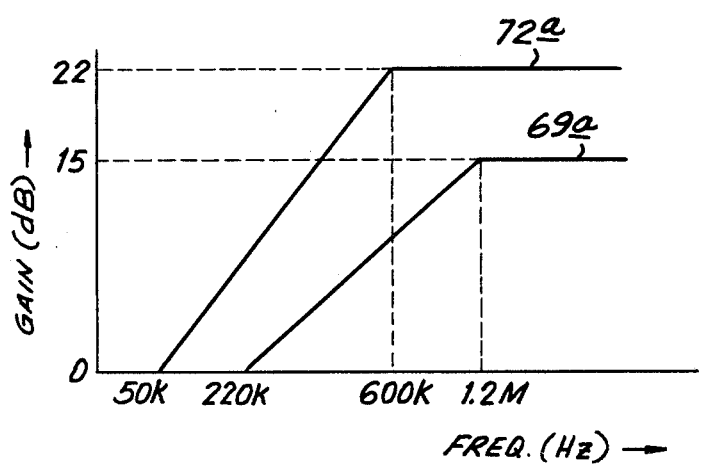
FIG. 5 is a graph showing pre-emphasis characteristics of pre-emphasis circuit included in the recording circuit of FIG. 1 and which are respectively operative during recording with two different tape speeds.

Further, since the maximum levels of the video signals applied through circuit 41 to clipping circuit 42 during recording with the slow tape speed are relatively reduced through the actions of gain control circuit 70 and clamping circuit 71, pre-emphasis circuit 72 may have a gain-frequency characteristic, for example, as indicated by the curve 72a on FIG. 5, for providing the video signals with an increased amount of emphasis and thereby maintaining a desirable signal-to-noise ratio for the frequency modulated signals even though the frequency deviation of the latter is reduced. In other words, due to the reduced peak-to-peak levels of the video signals applied through circuit 41 to clipping circuit 42 when recording with the slow tape speed, the emphasis provided by circuit 72 can be greater than the amount of emphasis provided by the pre-emphasis circuit 69 without the danger that overshoots at the maximum levels of the video signals will be excessively clipped in clipping circuit 42 and thereby result in distortion of the reproduced video signals upon demodulation of the latter.

Referring now to FIG. 2, it will be seen that the signal processing circuit 64 for processing the demodulated video signals from demodulator 62 during reproducing with the normal tape speed may include a deemphasis circuit 73 having a characteristic which is substantially complementary to that of pre-emphasis circuit 69, a gain control circuit 74 for restoring the level difference between the white level and sync tip level of the demodulated signals to the corresponding level difference of the original video signals applied to input terminal 38, and a clamping circuit 75 by which the sync tip levels of the demodulated video signals are returned to, or maintained at the corresponding level of the original video signals. Further, as shown on FIG. 2, the signal processing circuit 65 for processing the demodulated video signals from demodulator 62 during reproducing with the slow or long-playing tape speed may include a de-emphasis circuit 76 having a characteristic which is substantially complementary to that of pre-emphasis circuit 72, a gain control circuit 77 providing a gain to the demodulated signals different from the gain of circuit 74, and which is suitable to restore the level difference between the sync tip level and the white level of the demodulated signals to that of the original video signals applied to input terminal 38, and a DC level correcting or compensating circuit 78. The DC level correcting circuit 78 is shown to be controlled by the control signal $S_r$ (FIG. 9) of rectangular waveform produced by waveforming circuit 55 in response to the application thereto through amplifier 51 of the rotation indicating pulses from generator 37. More particularly, control signal $S_r$ causes circuit 78 to eliminate from the de-emphasized and gain-controlled video signals the DC level variation corresponding to the frequency difference of $\frac{1}{2}f_H$ between the carriers of the frequency modulated video signal as recorded in the successive tracks $T_A$ and $T_B$ during recording with the slow or long-playing tape speed. Furthermore, circuit 78 may be arranged to clamp or restore the sync tip level of the demodulated signals obtained from gain control circuit 77 at the sync tip level of the original video signals applied to input terminal 38.

Figure 10:
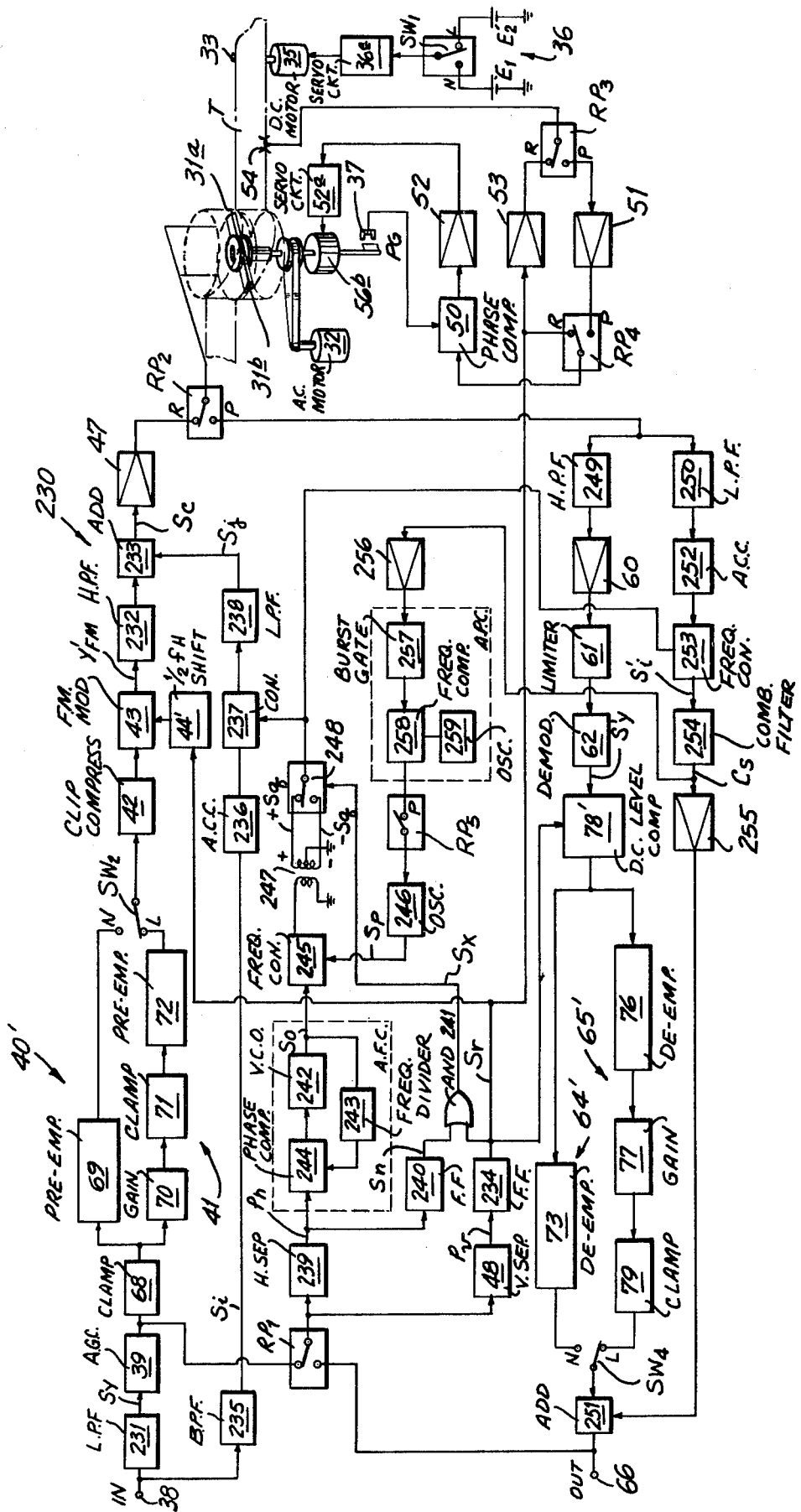
FIG. 10 is a schematic block diagram of an apparatus according to another embodiment of this invention for recording and reproducing color video signals.

It will be apparent that, in a modification of the recording circuit shown on FIG. 1, gain control circuit 67 and clamping circuit 68 may be removed from signal processing circuit 40, for example, as shown in the case of the signal processing circuit 40′ on FIG. 10, and clamping circuit 68 may be relocated between automatic gain control circuit 39 and the branched lines leading to signal processing circuits 40′ and 41. In the event of such modification, automatic gain control circuit 39 is relied upon to establish the desired frequency deviation, for example, of 1.3 MHz, of the frequency modulated signals when recording with the normal tape speed, while the relocated clamping circuit 68 clamps the sync tip levels of the video signals at a level suitable to provide the desired minimum frequency, for example, of 3.5 MHz, of the frequency modulated signals when recording with the normal tape speed. On the other hand, when recording with the slow or long-playing tape speed, that is, when the video signals are supplied from the relocated clamping circuit 68 through signal processing circuit 41 for modulating the carrier in frequency modulator 43, gain control circuit 70 changes the gain of the video signals as originally established by circuit 39 so as to obtain the desired reduced frequency deviation, for example, of 650 KHz, while clamping circuit 71 reclamps the sync tip level of the video signals at a level suitable to provide the desired minimum frequency, for example, of 3.85 MHz, of the frequency modulated signals. When the foregoing modificaton is effected in the recording circuit of FIG. 1, the gain control circuit 74 and the clamping circuit 75 may be omitted from the signal processing circuit operative on reproducing the signals with the normal tape speed, for example, as in the signal processing circuit 64' on FIG. 10. In that case, it is assumed that the video signals reproduced with the normal tape speed will, following demodulation in demodulator 62 and de-emphasis in circuit 73, have the same sync tip level and the same level difference between the sync tip level and the white level as the original video signals applied to input terminal 38.

Furthermore, in the above described embodiment of the invention, reference has been made, by way of example, to the use of a frequency deviation of 1.3 MHz of the frequency modulated signals when recording with the normal tape speed and of a frequency deviation of 650 KHz when recording with the slow or long-playing tape speed. However, it is to be understood that other values of the freqeuncy deviations for recording with the normal tape speed and for recording with the slow tape speed, respectively, may be employed, so long as the frequency deviation when recording with the slow tape speed is less, for example, as little a 100 KHz or smaller, than the frequency deviation when recording with the normal tape speed.

It will be apparent that, by reason of the reduced frequency deviation of the frequency modulated signals when recording with the slow or long-playing tape speed, the maximum frequency difference between the main signal reproduced from a track during the scanning thereof and the cross-talk signal reproduced from an adjacent track is correspondingly reduced, even in the absence of H-alignment of the adjacent tracks when recording with the slow tape speed. The interfering signal that results from such reduced frequency difference can be readily eliminated from the demodulated output of the reproducing circuit partly by reason of the different azimuth angles with which the air gaps of heads 31a and 31b are preferably provided for reducing the level of the cross-talk signal in respect to the recorded frequency modulated signals, and also partly by reason of the fact that the frequency modulated signals are recorded in the adjacent tracks with respective different carrier frequencies which are in frequency interleaving relation to each other. Thus, when, for example, head 31a is scanning a track $T_A$, the frequency modulated signals reproduced from that track, that is, the main signal, and the cross-talk signal reproduced by the head 31a from an adjacent track $T_B$, will have respective carrier frequencies that differ by $(m+\frac{1}{2})f_H$. Thus, the interfering signal due to cross-talk is in frequency interleaving relation to the main reproduced signal. When the reproduced signals are demodulated by demodulator 62, the output of the latter will include the disired video signals and also the interfering signal having the frequency $(m+\frac{1}{2})f_H$ and which is therefore inverted in phase in successive horizontal intervals of the video signal. By reason of the foregoing, when the reproduced video signals obtained at output terminal 66 are applied to a cathode ray tube, the interfering signal due to cross-talk will tend to be visually cancelled on the screen of the cathode ray tube.

Although the above described embodiment of the invention shifts the frequency of the carrier which is modulated by the video signals in frequency modulator 43 so that the frequency modulated signals recorded in adjacent tracks will have different carrier frequencies for the purposes indicated above, a similar substantial cancellation of the interfering signal due to cross-talk can be achieved by suitably changing the phases of the carriers of the frequency modulated signals recorded in adjacent tracks, for example, as disclosed in the U.S. Patent Applicaton of Thoshihiko Numakura corresponding to Japanese Patent Application No. 83660/76 and having a common assignee herewith (which application is identified by attorney file No. SO923).

In the embodiment of the invention described above with reference to FIGS. 1 and 2, the video signals applied to the input terminal 38 to be recorded and reproduced were monochrome or black and white video signals containing only luminance information. However, as shown on FIG. 10, the invention may also be desirably embodied in an apparatus 230 for recoding and reproducing color video signals composed of both chrominance and luminance components, and in which elements corresponding to those previously described with reference to FIGS. 1 and 2 are identified by the same reference numerals. More particularly, it will be noted that, in the apparatus 230, the invention is applied to the luminance component of the color video signals for eliminating the intefering signal due to cross-talk in respect to the luminance component, as previously described with reference to the embodiment of FIGS. 1 and 2, whereas the interfering signal due to cross-talk in respect to the chrominance component is eliminated by recording the chrominance component with different carriers in adjacent tracks.

Referring to FIG. 10 in detail, it will be seen that, in the recording section of apparatus 230, an input terminal 38 receives the color video signals which include luminance and chrominance components and are composed of line, field and frame intervals with blanking and synchronizing portions in each of those intervals. Such color video signals are applied from terminal 38 to a low pass filter 231 which transmits substantially only the luminance component or signal $S_Y$ to an automatic gain control circuit 39. The gain controlled luminance component from circuit 39 is applied to a clamp circuit 68 which clamps the sync-tip level of the luminance component to a fixed reference level. Thereafter, in dependence on the condition of a switch $SW_2$ for selecting either the normal or long-playing recording operation, the clamped luminance component is passed either through a signal processing circuit 40' or a signal processing circuit 41 to a clipping circuit 42 and, through the latter, to a frequency modulator 43 for frequency modulating a suitably high frequency carrier in the latter. The frequency modulated luminance component $Y'_{FM}$ issuing from modulator 44 is passed through a high-pass filter 232 to a mixing or adding circuit 233.

In the apparatus 230, the carrier frequency of the frequency modulated luminance component $Y'_{FM}$ issuing from modulator 44 is shifted between first and second carrier frequencies which are in frequency interleaving relation to each other, and such shifting of the carrier frequency is controlled so that the frequency modulated luminance component, as recorded in tracks which are next adjacent to each other, has the first and second carrier frequencies, respectively, both during a normal recording operation and a long-playing recording operation. In order to effect the foregoing in apparatus 230, the output of automatic gain control circuit 39 is also applied through an R contact of a record playback switch $RP_1$ which, in its recording position, as shown, applies the same to a vertical synchronizing signal separating circuit 48. The vertical synchronizing signals $P_y$ thus separated from the incoming video signals are applied to a flip-flop circuit 234 for providing the control signal $S_r$ (FIG. 9) of rectangular waveform which is, in turn, applied to a circuit 44' by which the carrier frequency modulated in frequency modulator 43 is shifted by $\frac{1}{4}f_H$ for successive field intervals of the video signals, as previously described.

The color video signals applied to input terminal 38 are also supplied from the latter to a band pass filter 235 which separates the chrominance component $S_i$ from the color video signals and passes such chrominance component through an automatic color control circuit 236 to a frequency converter 237 in which the chrominance component is converted to a frequency band lower than that of the frequency modulated luminance component $Y'_{FM}$ supplied to mixing circuit 233. The resulting frequency converted component $S_j$ is supplied from frequency converter 237 through a low-pass filter 238 to another input of mixing circuit 233 so as to be combined in the latter with the frequency modulated luminance component $Y'_{FM}$ for providing a composite signal $S_c$ which is supplied through a recording amplifier 47 and a record contact R of a record-plyback switch RP$_2$ to the rotary heads 31a-31b.

The output of flip-flop 234, which corresponds to the divider 49 on FIG. 1, is applied through an amplifier 53 to a record contact R of a record-playback switch RP$_3$ which, in its recording position, as shown, applies the resulting control signals to a fixed transducer or head 54 for recording by the latter at spaced apart locations along a longitudinal edge of the tape T. It will be understood that such control signals recorded by fixed head 54 occur in correspondence with the recording of color video signals in alternating, or every other one of the tracks so as to identify or distinguish between the tracks in which the frequency modulated luminance component is recorded with first and second carrier frequencies and the chrominance component is recorded with first and second carriers, as hereinafter described in detail.

The control signal $S_r$ from divider or flip-flop 234 is also employed in a servo system for regulating the rotary movements of heads 31a and 31b. As shown, control signal $S_r$ is applied to the R contact of a record-playback switch RP$_4$ which, in its illustrated recording position, applies control signal $S_r$ to one of the inputs of a phase comparator 50. Another input of phase comparator 50 receives the rotation indicating pulses from generator 37 associated with the shaft of heads 31a and 31b. Comparator 50 compares the phases of the control signals $S_r$ from flip-flop 234 and of the pulse signals from generator 37 and provides a corresponding brake-control or servo signal which is passed through an amplifier 52 to a servo circuit 52a for either suitably decreasing or increasing the braking force exerted by a brake 52b acting on the shaft of rotary heads 31a and 31b. Thus, the speed at which heads 31a and 31b is rotated by a motor 32 is regulated so that heads 31a and 31b will commence to move along respective tracks $T_A$ and $T_B$ on tape T at the commencement of alternating field intervals of the color video signals being recorded.

The gain controlled luminance component from circuit 39 is further shown to be applied through record-playback switch RP$_1$ to a horizontal synchronizing signal separator 239 which separates the horizontal synchronizing signals $P_h$ therefrom for application to a flip-flop 240. The resulting rectangular waveform or control signal $S_h$ from flip-flop 240 has successive high and low intervals each equal to one line interval H and is applied to one input of an AND circuit 241 which, at its other input, receives the rectangular waveform or signal $S_r$ from flip-flop 234 having successive high and low intervals each equal to one field interval. As a result of the foregoing, the output or control signal $S_x$ from AND circuit 241 remains low during each field interval recorded in a track $T_A$ and goes high only during alternate line intervals of each field interval recorded in a track $T_B$. In the illustrated recording and reproducing apparatus 230, such output or control signal $S_x$ from AND circuit 241 is employed for controlling the establishment of different carriers for the frequency converted chrominance component $S_j$ to be recorded in tracks that are next adjacent to each other, with such carriers differing from each other in their polarity characteristics, for example, as described in detail in U.S. Pat. Nos. 3,925,910, No. 4,007,482 and No. 4,007,484.

In the illustrated apparatus 230, the circuit for frequency converting the chrominance component $S_i$ and for providing the different carriers with which the frequency converted chrominance component $S_j$ is recorded in tracks that are next adjacent each other is shown to include a voltage controlled oscillator 242 providing an output $S_o$ with a center frequency of, for example $44f_H$. The output $S_o$ of oscillator 242 is applied to a frequency divider 243 to be divided in the latter by 44, and the output of divider 243 is applied to a comparator 244 which also receives the separated horizontal synchronizing signals $P_h$ from separator 239. It will be appreciated that comparator 244 compares the frequency of the output from divider 243 with the frequency $f_H$ of the separated horizontal synchronizing signals $p_h$ and, upon any deviation therebetween, provides a suitable control voltage to voltage controlled oscillator 242 for automatically maintaining the output $S_o$ at a frequency of $44f_H$.

The output $S_o$ of oscillator 242 is also applied to a frequency converter 245 in which the output $S_o$ is frequency converted by a frequency converting signal $S_p$ from a voltage controlled oscillator 246 having a center frequency of $f_i$-$\frac{1}{4}f_H$, in which $f_i$ is the original or standard carrier frequency of the chrominance component $S_i$ of the color video signals being recorded. The output of frequency converter 245 is applied to a transformer 247 having a center tapped secondary with two outputs ± of opposite polarity art which frequency converting signals +$S_q$ and -$S_q$, respectively appear. Such frequency converting signals +$S_q$ and -$S_q$ are of opposite phase or polarity and have the frequency $(f_i+44f_H-\frac{1}{4}f_H)$. The frequency converting signals +$S_q$ and -$S_q$ are alternatively applied to frequency converter 237 through a switching circuit 248 which is controlled by the control signal $S_x$ from AND circuit 241 so that frequency converting signal +$S_q$ is applied to converter 237 whenever control signal $S_x$ has a low value, and frequency converting signal -$S_q$ is applied to converter 237 whenever control signal $S_x$ has a high value. Frequency converting signal +$S_q$ and -$S_q$ alternately applied to frequency converter 237 are effective in the latter to convert the carrier of the chrominance component from its original carrier frequency $f_i$ to a relatively lower carrier frequency $f_c=44f_H-\frac{1}{4}f_H$. As a result of the foregoing, the frequency converted chrominance component $S_j$ applied from frequency converter 237 through filter 238 to mixing or adding circuit 233 has a frequency band lower than that of the frequency modulated luminance component $Y'_{FM}$. During each interval when the frequency converting signal -$S_q$ is applied to frequency converter 237, the polarity or phase of the carrier of the frequency converted chrominance component $S_j$ is reversed as compared with the phase or polarity of such carrier during each interval when the frequency converting signal $+S_q$ is applied to frequency converter 237.

It will also be noted that the carrier frequency $f_c$ of the frequency converted chrominance component $S_j$ satisfies the equation $$f_c = \tfrac{1}{4}f_H(2m-1)$$

in which m is a whole positive integer. Of course, in the present case, in which $f_c = 44f_H - \tfrac{1}{4}f_H$, the value of m in the above equation is 88.

As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise (S/N) ratio of the chrominance component, as described in detail in U.S. Pat. No. 3,730,983, having a common assignee herewith.

The frequency converted chrominance component $S_j$ and the frequency modulated luminance component $Y'_{FM}$ are combined in mixing circuit 233, with the frequency converted chrominance component amplitude modulating the frequency modulated luminance component to provide the combined or composite signal $S_c$ which is applied through amplifier 47 and record-playback switch $RP_2$, in the record position of the latter, to heads 31a and 31b for recording by such heads in the successive parallel tracks on tape T.

In the apparatus 230 the speed of rotation of a motor 35 for driving a capstan 33 is controlled through a servo circuit 36a which selectively receives either a control voltage $E_1$ or a control voltage $E_2$ from a motor control circuit 36 in dependence on the position of a switch $SW_1$. Thus, when switch $SW_1$ engages its L contact for applying the control voltage $E_2$ to servo circuit 36a, the latter effects rotation of motor 35 at a speed suitable to cause capstan 33 to drive tape T at the slow or long-playing speed. Alternatively, when switch $SW_1$ engages its contact N, the control voltage $E_1$ thus applied to servo circuit 36a causes capstan 33 to drive the tape at the normal tape speed. Further, it will be appreciated that switches $SW_1$ and $SW_2$ are ganged or interconnected for simultaneously selecting the conditions for recording either at the normal tape speed or the long-playing tape speed.

Similarly, the record-playback switches RP;hd 1-$RP_4$ are ganged or interconnected so as to be simultaneously changed-over from their recording positions shown on FIG. 10 to their reproducing or playback positions in which the movable contact of each of the enumerated switches engages a respective playback contact P. In the reproducing or playback section of apparatus 230, the playback terminal P of switch $RP_2$ is connected to a high pass filter 249 and a low pass filter 250 so as to apply to such filters the signals being alternately reproduced by heads 31a and 31b from the successive parallel tracks $T_A$ and $T_B$ on tape T. The filters 249 and 250 respectively separate the frequency modulated luminance component $Y'_{FM}$ and the frequency converted chrominance component $S_j$ from the reproduced signals. The frequency modulated luminance component $Y'_{FM}$ separated from the reproduced signals is passed through an amplifier 60 and a limiter 61 to a frequency demodulator 62 so as to obtain a demodulated luminance component $S'_Y$. Since the frequency modulated luminance component $Y'_{FM}$ has its carrier frequency shifted by $\tfrac{1}{4}f_H$ for recording in successive tracks when recording with the normal tape speed, as well as when recording with the slow tape speed, in the apparatus 230, the demodulated luminance component $S'_Y$ from demodulator 62 is applied directly to a DC level corrector or compensator 78' controlled by the control signal $S_r$ from flip-flop 234 so as to eliminate from the demodulated luminance component the DC leve, variation corresponding to the $\tfrac{1}{4}f_H$ frequency difference between the carriers of the frequency modulated luminance component as recorded in the next adjacent tracks.

When reproducing with theslow or long-playing tape speed, the DC level compensated luminance component is passed through a signal processing circuit 65', and then by way of the L contact of switch $SW_4$, to an input of an adding or mixing circuit 251. On the other hand, when reproducing with the normal tape speed, the DC level compensated luminance component is passed through a signal processing circuit 64', and then by way of the N contact of switch $SW_4$, to the adding or mixing circuit 251. It will be seen that the signal processing circuit 64' operative during reproducing with the normal tape speed may comprise only the de-emphasizing circuit 73 applying an amount of de-emphasis substantially equal to the amount of emphasis applied to the video signals by preemphasizing circuit 69 when recording with the normal tape speed. It is to be assumed that, by reason of the DC level compensation in circuit 78', the luminance component, after de-emphasis in circuit 73, will have its sync tip level restored to the sync tip level of the original video signals and will have the original difference between its sync tip and white levels.

On the other hand, in the signal processing circuit 65' operative during reproducing with the slow or long-playing tape speed, the DC level compensated output of circuit 78' is deemphasized in circuit 76 by an amount substantially equal to the emphasis applied in preemphasizing circuit 72, and then has the difference between its sync tip and white levels restored to such difference in the luminance component of the original video signals by means of gain control circuit 77. Thereafter, in circuit 65', the gain controlled luminance component is applied to a clamping circuit in which the sync tip level is again clamped at the original value.

The frequency converted chrominance component $S_j$ separated from the reproduced signals by filter 250 is shown to be applied through an automatic color control circuit 252 to a frequency reconverter 253 which alternately receives the frequency converting signals $+S_q$ and $-S_q$ from switching circuit 248, and by which the carrier of the reproduced chrominance component $S_j$ is reconverted to the original carrier frequency $f_i$. The resulting frequency reconverted chrominance component $S'_i$ is passed through a comb filter 254 in which, as hereinafter described in detail, chrominance components of cross-talk signals are cancelled or suppressed so that only the chrominance component $C_s$ of the video signals being reproduced from a particular track $T_A$ or $T_B$ by the head 31a or 31b, respectively, is passed through an amplifier 255 to mixing circuit 251 for combining in the latter with the luminance component $S_y$ and thereby forming the desired reproduced video signals applied to output terminal 66.

The output of comb filter 255 is also shown to be supplied through an amplifier 256 to a burst gate 257 which extracts burst signals from the reconverted chrominance signal component $S'_i$ and applies the extracted burst signals to one input of a phase comparator 258. An oscillator 259 provides an output at the standard or original carrier frequency $f_i$ for the chrominance component, and such output is applied to a second input of comparator 258. The output of phase comparator 258 is connected to a playback terminal P of a switch $RP_5$ which is also ganged or interconnected with the record-playback switches $RP_1$–$RP_4$ so as to be effective, in the playback or reproducing mode of operation of apparatus 230, to apply the output of phase comparator 258 as a control voltage to the voltage controlled oscillator 246. It will be apparent that, in the reproducing mode of operation, any phase difference between the burst signals extracted by gate 257 from the reconverted chrominance component and the output of oscillator 259 causes comparator 258 to apply a suitable control voltage to voltage control oscillator 246 for effecting a required change in the phase of the converting signals $+S_q$ and $-S_q$, whereby to achieve an automatic phase control function for eliminating so-called jitter from a picture or image produced by a cathode ray tube in response to color video signals obtained at output terminal 66.

In the reproducing mode of operation of apparatus 230, control signal $S_x$ for operating switching circuit 248 is again obtained from AND circuit 241 in response to the control signals $S_r$ and $S_h$ from flip-flops 234 and 240, respectively. However, in this case, the reproduced video signals from mixing circuit 251 are applied through contact P of record-playback switch $RP_1$ to the vertical and horizontal synchronizing signal separating circuits 48 and 239 so that flip-flops 234 and 240 are respectively triggered by the vertical and horizontal synchronizing signals separated from the reproduced color video signals. Further, in the reproducing mode of operation, fixed head 54 reproduces the recorded control signals which distinguish the tracks $T_A$ from the tracks $T_B$, and the control signals reproduced by head 54 are applied to one input of phase comparator 50 through contact P of record-playback switch $RP_3$, an amplifier 51 and contact P of record-playback switch $RP_4$. The other input of phase comparator 50, as before, receives the rotation indicating pulses from generator 37 so that phase comparator 50 applies a suitable control signal through amplifier 52 to servo circuit 52a for causing brake 52b to suitably control the rotation of heads 31a and 31b by motor 32. It will be apparent that the described servo control arrangement is effective, in the reproducing mode of operation to ensure that each of the tracks on tape T will be scanned by the same head 31a or 31b which was employed for recording video signals in such track.

The above described recording and reproducing apparatus 230 operates as follows:

RECORDING MODE OF OPERATION

In the recording mode of operation of apparatus 230, each of switches $RP_1$–$RP_5$ is in its recording position so as to engage the respective recording contact R, as shown on FIG. 23. In the recording operation of apparatus 230, the control signal S from flip-flop 234 triggered by vertical synchronizing signals $P_v$ separated from the luminance component $S_y$ of the color video signals applied to input terminal 38 is compared, in phase comparator 50, with the output of the rotation indicating pulses from generator 37 so as to provide a suitable servo control signal by which the rotary movements of heads 31a and 31b are controlled for causing such heads to commence the scanning of alternating tracks $T_A$ and $T_B$ on the tape at the commencement of respective field intervals of the color video signals.

During recoding, the operation of frequency shifting circuit 44' is controlled by conrol signal $S_r$ from flip-flop 234 so as to establish the desired difference of $\frac{1}{2}f_H$ between the carrier frequencies with which the frequency modulated luminance component $Y'_{FM}$ is recorded in alternating tracks on the tape T. In other words, the frequency modulated luminance components $Y'_{FM}$ of the composite or combined signals $S_c$, as recorded by heads 31a and 31b in tracks which are next adjacent to each other on tape T, have different carrier frequencies which are in frequency interleaving relation to each other.

Further, during recording, the chrominance component $S_i$ separated from the incoming color video signals and having the original or standard carrier frequency $f_i$, is acted upon in frequency converter 237 by the frequency converting signal $+S_q$ or $-S_q$ so as to provide the frequency converted chrominance component $S_j$ with the reduced carrier frequency $f_c = 44f_{H\frac{1}{2}H}$. Thus, the frequency band of the frequency converted chrominance component $S_j$ is lower than that of the frequency modulated luminance component $Y'_{FM}$ with which it is combined in mixing circuit 233 to constitute the composite or combined signal $S_c$ alternately recorded by heads 31a and 31b in the successive tracks on tape T. The alternative application of frequency converting signals $+S_q$ and $-S_q$ to frequency converter 237 is determined by switching circuit 248 which, in turn, is controlled by the control signal $S_x$ from AND circuit 241. Since frequency converting signals $+S_q$ and $-S_q$ are of opposite phase or polarity, the effect thereof in frequency converter 237 will be to provide the resulting frequency converted chrominance component $S_j$ with respective carriers $C_a$ and $-C_a$ which are similarly of opposed phase or polarity. By reason of the previously described configuration of control signal $S_x$, during each field interval recoded by head 31a, converting signal $+S_q$ is continuously applied to frequency converter 237 with the result that the successive line intervals of each field interval recorded by head 31a in a respective track $T_A$ are provided with a carrier of the same polarity. On the other hand, during successive line intervals of each field interval recorded by head 31b in a respective track $T_B$, frequency converting signals $+S_q$ and $-S_q$ are alternately applied to frequency converter 237 so that the successive line intervals of each field interval recorded by head 31b are altenrately recorded with the carriers $C_a$ and $-C_a$ of opposed polarity.

Of course, in the recoding mode of operation of apparatus 230, switches $SW_1$ and $SW_2$ are made to engage either their N contacts or their L contacts depending upon whether the nomal tape speed or the relatively slow or long-playing tape speed is to be employed for the recording operation. If the long-playing tape speed is selected for the recording operation, gain adjusting circuit 70, clamping circuit 71 and preemphasis circuit 72 of signal processing circuit 41 are respectively effective to provide the luminance omponent with a reduced difference between its sync tip and white levels, a relatively raised sync tip level and a relatively large emphasis so as to permit the eventual elimination from the reproduced luminance component of the FM noise signal and of the interfering signal due to cross-talk, as previously described with reference to the apparatus 30.

REPRODUCING MODE OF OPERATION

In the reproducing mode of operation of apparatus 230, switches $RP_1$–$RP_5$ are changed over to engage their respective reproducing or playback terminals P, and switches $SW_1$ and $SW_4$ are positioned to engage either their N contacts or their L contacts in dependence on the tape speed with which the video signals to be reproduced were originally recorded. During reproducing operation, signals reproduced alternately by heads 31a and 31b from the successive tracks on tape T are applied through switch $RP_2$ to filters 249 and 250 which respectively separate the frequency modulated luminance component $Y'_{FN}$ and the frequency converted chrominance component $S_j$ from the reproduced signals. In the reproducing operation of apparatus 230, the rotation of heads 31a and 31b is regulated, on the basis of a comparison of the control signals reproduced from the tape by fixed head 54 with the rotation indicating signals from generator 37, so that the signals recorded in tracks $T_A$ and $T_B$ of tape T by heads 31a and 31b will be reproduced by such heads 31a and 31b, respectively. Further, as a result of such servo control of the rotation of heads 31a and 31b during reproducing the control signal $S_r$ which controls the DC level correcting circuit 71 in signal processing circuit 133, and the control signal $S_x$ from AND circuit 241 which controls switching circuit 248 have the same relationships to the operative positioning of heads 31a and 31b as they have during the recording operation.

The frequency modulated luminance component $Y'_{FM}$ separated from the reproduced signals is demodulated in frequency demoulator 62 so as to obtain the demodulated luminance component $S'_Y$ which will have changes in the level thereof corresponding to the different carrier frequencies with which the frequency modulated luminance component $Y'_{FM}$ was recorded in the next adjacent tracks on tape T. However, by reason of the control signal $S_r$ applied to the DC level compensating or correcting circuit 78', the latter will eliminate such changes in level of the demodulated luminance component applied through signal processing circuit 64' or 65' to mixing circuit 251. During reproducing operation, the interfering signal due to cross-talk in respect to the luminance component of the video signals is eliminated partly by reason of the different azimuth angles with which the air gaps of heads 31a and 31b are preferably provided, and also, as previously described with reference to the apparatus 30, partly by reason of the fact that the frequency modulated luminance component is recorded with different carrier frequencies in the adjacent tracks, which carrier frequencies differ from each other by $(m+\frac{1}{2})f_H$.

Moreover, when the recording and reproducing operations of apparatus 230 are performed with the slow or long-playing tape speed, the action of processing circuit 41 in reducing the frequency deviation of frequency modulated luminance component and in increasing the pre-emphasis of the luminance component will be effective to substantially complete the elimination from the luminance component $S_Y$ applied to mixing circuit 251 of the interfering signal due to cross-talk and of the FM noise signal, as previously described in detail with respect to apparatus 30.

Considering the frequency converted chrominance component, it should be noted that the effect of providing the same with carriers $C_a$,—$C_a$ of reversed phase or polarity in successive line intervals or areas of each track recorded by head 31b is to provide a new carrier $C_b$ having frequency components offset by $\frac{1}{2}f_H$, or interleaving with respect to the frequency components of the carrier $C_a$ with which the frequency converted chrominance component is recorded in the next adjacent track by head 31a, as described in detail in U.S. Pat. No. 3,025,810.

Accordingly, in the reproducing operation of apparatus 230, when, for example, head 31a scans a track $T_A$ on tape T for reproducing the frequency converted chrominance component recorded therein with the carrier $C_a$, the undesired or cross-talk signal simultaneously reproduced by head 31a from the next adjacent track $T_B$ has its frequency converted chrominance component provided with a carrier in frequency interleaving relation to the carrier $C_a$.

During the reproducing operation of apparatus 230, switching circuit 248 is again controlled by control signal $S_x$ from AND circuit 241 so that frequency reconverter 253 continuously receives the frequency converting signal $+S_q$ during the scanning of a track by head 31a, and so that frequency converting signals $+S_q$ and $-S_q$ are alternately applied to frequency reconverter 253 for successive line intervals during the scanning of a track $T_B$ by head 31b. As a result of the foregoing, during the scanning of a track by head 31a, frequency reconverter 253 reconverts the carrier $C_a$ of the chrominance component then being reproduced to a carrier having the original or standard carrier frequency $f_i$, while the carrier of the cross-talk chrominance component has its frequency similarly shifted so as to be spaced midway between the principal side bands of the desired carrier. Similarly, during the scanning of a track $T_B$ by head 31b, frequency converter 253 frequency converts the carrier $C_b$ of the chrominance component being reproduced from such track to a carrier also having the original or standard frequency $f_i$, while the carrier of the cross-talk chrominance component then being reproduced has its frequency similarly shifted so as to be spaced midway between the principal side bands of the desired reconverted carrier. Thus, the reconverted carriers of the chrominance component reproduced during alternate field intervals both have the same carrier frequency $f_i$, while the chrominance component of the undesired or cross-talk signal is, in each case, spaced midway between the principal side bands of the desired carrier and can be eliminated by the comb filter 254 to yield the desired reconverted chrominance component $C_s$ free of any cross-talk chrominance component.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording a video signal on a magnetic tape comprising:

modulating means for frequency modulating a carrier with said video signal to provide a frequency modulated signal;

drive means for selectively driving said tape at a plurality of different tape speeds;

transducer means receiving said frequency modulated signal and repeatedly traversing the tape at a uniform rate so that said transducer means records the frequency modulted signal in successive parallel tracks on the tape with the pitch of said tracks being determined by the tape speed; and means for changing the frequency deviation of said frequency modulated signal in accordance with the speed at which the tape is selectively driven so that said frequency deviation decreases with decreasing tape speed.

2. Apparatus according to claim 1; further comprising means for pre-emphasizing said video signal prior to the frequency modulation of said carrier therewith; and means for changing the amount of emphasis applied to the video signal by said pre-emphasizing means in accordance with the speed at which the tape is selectively driven so that said amount of emphasis increases with decreasing tape speed.

3. Apparatus according to claim 1; in which said means for changing the frequency deviation of said frequency modulated signal in accordance with the tape speed effects changes in said frequency deviation substantially proportional to changes in the tape speed.

4. Apparatus according to claim 1; in which said means for changing the frequency deviation of said frequency modulated signal includes gain-control means acting on said video signal in advance of said modulating means and applying a reduced gain to said video signal when the tape speed is decreased.

5. Apparatus according to claim 4; in which said means for changing the frequency deviation of said frequency modulated signal further includes clamping means acting on said video signal in advance of said modulating means and raising the level at which the sync tip level of the video signal is clamped when the tape speed is decreased.

6. Apparatus according to claim 4; further comprising pre-emphasizing means acting on said video signal in advance of said modulating means and increasing the amount of emphasis applied to said video signal when the tape speed is decreased.

7. Apparatus according to claim 1; further comprising means for shifting the carrier frequency of the frequency modulated signal between different first and second carrier frequencies which are in frequency interleaving relation to each other, and means for controlling said shifting of the carrier frequency so as to record said frequency modulated signal with said first and second carrier frequencies, respectively, in tracks which are next adjacent each other.

8. Apparatus according to claim 7; in which said first and second carrier frequencies differ from each other by $(m+\frac{1}{2})f_H$ in which m is a whole positive integer and $f_H$ is the horizontal synchronizing signal frequency of the video signal.

9. Apparatus according to claim 1; in which said video signal is the luminance component of a color television signal which further has a chrominance component; and further comprising means for frequency converting said chrominance component to a lower frequency band than that of the frequency modulated luminance component, and means for combining the frequency converted chrominance component with the frequency modulated luminance component to provide a composite signal for recording on the magnetic tape.

10. Apparatus according to claim 9; in which said chrominance component of the color television signal has an original carrier frequency; and in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency.

11. Apparatus according to claim 10; in which said original and relatively lower carrier frequencies of the chrominance component are in frequency interleaving relation to each other and to the horizontal synchronizing signal frequency of the video signal.

12. Apparatus according to claim 11; in which said relatively lower carrier frequency has its second harmonic in frequency interleaving relation to said horizontal synchronizing signal frequency of the video signal.

13. Apparatus according to claim 12; in which said relatively lower carrier frequency of the frequency converted chrominance component is selected to satisfy the following equation:

$$f_c = \tfrac{1}{4}f_H(2m-1)$$

in which $f_c$ is said relatively lower carrier frequency, $f_H$ is said horizontal synchronizing signal frequency of the video signal, and m is a whole positive integer.

14. Apparatus according to claim 1; in which said transducer means includes first and second magnetic transducers for respectively recording the frequency modulated signal in the tracks which are next adjacent each other, and said first and second transducers have gaps with substantially different azimuth angles.

15. Apparatus according to claim 1; in which said video signal is the luminance component of a color television signal which further has a chrominance component and which is comprised of field intervals and predetermined numbers of line intervals included in each field interval and being recorded in respective areas of said successive parallel tracks; and further comprising means for providing different first and second carriers for said chrominance component, carrier selecting means for alternatively selecting the first and second carriers for said chrominance component to be recorded in the tracks, and control means for the carrier selecting means operative to cause the recording of said chrominance component with the first and second carriers therefor, respectively, in said tracks which are next adjacent each other.

16. Apparatus according to claim 15; in which said first and second carriers for the chrominance component have different polarity characteristics.

17. Apparatus according to claim 16; in which the polarity of said first carrier for the chrominance component is constant during successive line intervals of the signal being recorded in one of the tracks, and the polarity of the second carrier for the chrominance component is reversed after each predetermined number of said line intervals of the signal being recordedin the next adjacent track.

18. Apparatus according to claim 15; further comprising means for recording on the record medium control signals which are in predetermined positional relation to said tracks and which identify the tracks having the chrominance component recorded therein with said first and second carriers, respectively.

19. Apparatus according to claim 1; in which sid transducer means includes first and second magnetic heads alternately traversing the tape at said uniform rate; said drive means selectively drives said tape at a first relatively slow tape speed by which said heads are made to scan overlapping areas on said tape to provide said tracks in abutting relation and with the widths of said tracks being less than the widths of said heads, and at a second relatively fast tape speed by which said tracks are spaced apart to provide guard bands therebetween and the widths of the tracks are equal to said widths of the heads; and said means for changing the frequency deviation of the frequency modulated signal includes first and second signal processing means selectively operative on said video signal in advance of said modulating means for establishing respective gains and sync tip levels for said video signal, and switching means for selectively making operative said first signal processing means and said second signal processing means when the tape is moved at said first and second tape speeds, respectively.

20. Apparatus according to claim 19; in which said video signal is comprised of field intervals and predetermined numbers of line intervals included in each field interval and being recorded in respective areas of said successive parallel tracks; the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks to provide H-alignment at said second tape speed, so that said H-alignment is absent when the tape is moved at said first tape speed.

21. Apparatus according to claim 20; in which said first and second signal processing means further include respective pre-emphasizing means for applying relatively larger and relatively smaller amounts of pre-emphasis, respectively, to said video signal when the tape is driven at said first and second tape speeds, respectively.

22. Apparatus according to claim 21; further comprising means operative at least when the tape is moved at said first tape speed for shifting the carrier frequency of the frequency modulated signal between different first and second carrier frequencies which are in frequency interleaving relation to each other, and means for controlling said shifting of the carrier frequency so as to record said frequency modulated signal with said first and second carrier frequencies, respectively, in tracks which are next adjacent each other.

23. Apparatus for recording and reproducing a video signal on a magnetic tape comprising:
drive means for selectively driving the tape at a plurality of different tape speeds;
transducer means repeatly traversing said tape at a uniform rate so as to scan successive parallel tracks on the tape with the pitch of said tracks being determined by the tape speed;
a recording section including modulating means for frequency modulating a carrier with the video signal and thereby providing a frequency modulated signal to said transducer means for recording by the latter in said successive parallel tracks, and means for changing the frequency deviation of said frequency modulated signal in accordance with the speed at which the tape is selectively driven so that said frequency deviation decreases with decreasing tape speed; and
a reproducing section including demodulating means for frequency demodulating the frequency modulated signal reproduced by said transducer means from the successive parallel tracks scanned thereby on the tape, and means operative in dependence on the tape speed at which the tape is driven during the reproducing of the frequency modulated signal by said transducer means to compensate the demodulated signal from said demodulating means for the frequency deviation of the frequency modulated signal corresponding to the respective tape speed.

24. Apparatus according to claim 23; in which said recording section further includes pre-emphasizing means acting on said video signal prior to the frequency modulation of said carrier therewith for providing said video signal with an amount of pre-emphasis which changes in accordance with the speed at which the tape is selectively driven so that said amount of pre-emphasis increases with decreasing tape speed; and said reproducing section includes de-emphasizing means acting on said demodulated signal for providing the latter with an amount of de-emphasis which changes in accordance with the speed at which the tape is selectively driven so that said amount of de-emphasis increases with decreasing tape speed.

25. Apparatus according to claim 23; in which said means for changing the frequency deviation of said frequency modulated signal in accordance with the tape speed effects changes in said frequency deviation substantially proportional to changes in the tape speed.

26. Apparatus according to claim 23; in which said means for changing the frequency deviation of said frequency modulated signal includes gain-control means acting on said video signal in advance of said modulating means and applying a reduced gain to said video signal when the tape speed is decreased; and said means operative to compensate the demodulated signal includes gain-control means acting on said demodulated signal and applying a gain to the latter which is increased when the tape speed is decreased.

27. Apparatus according to claim 26; in which said means for changing the frequency deviation of said frequency modulated signal further includes clamping means acting on said video signal in advance of said modulating means and raising the level a which the sync tip level of the video signal is clamped when the tape speed is decreased; and said means operative to compensate the demodulated signal includes clamping means acting on said demodulated signal and lowering the level at which the sync tip level of the demodulated signal is clamped when the tape speed is decreased.

28. Apparatus according to claim 27; in which said recording section further includes pre-emphasizing means acting on said video signal prior to the frequency modulation of said carrier therewith for providing said video signal with an amount of pre-emphasis which changes in accordance with the speed at which the tape is selectively driven so that said amount of pre-emphasis increases with decreasing tape speed; and said reproducing section includes de-emphasizing means acting on said demodulated signal for providing the latter with an amount of de-emphasis which changes in accordance with the speed at which the tape is selectively driven so that said amount of de-emphasis increases with decreasing tape speed.

29. Apparatus according to claim 23; in which said recording section further includes means for shifting the carrier frequency of the frequency modulated signal between different first and second carrier frequencies which are in frequency interleaving relation to each other, and means for controlling said shifting of the carrier frequency so as to record said frequency modulated signal with said first and second carrier frequencies, respectively, in tracks which are next adjacent each other; and in which said reproducing section includes means for eliminating from the demodulated signal the changes in levels thereof corresponding to said different first and second carrier frequencies with which the frequency modulated signals were recorded in the next adjacent tracks, respectively.

30. Apparatus according to claim 23; in which said video signal is the luminance component of a color television signal which further contains a chrominance component having an original carrier frequency; and in which said recording section includes means for frequency converting said chrominance component to a lower frequency band than that of the frequency modulated luminance component, and means for combining the frequency converted chrominance component with the frequency modulated luminance component to provide a composite signal for recording on the tape; and said reproducing section further includes means for individually separating the frequency modulated luminance component and the frequency converted chrominance component from the reproduced composite signal, and means for frequency reconverting the separated frequency converted chrominance component back to said original carrier frequency therefor.

31. Apparatus according to claim 30; in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency; and in which said means for frequency reconverting the separated frequency converted chrominance component includes another frequency converter receiving said separated frequency converted chrominance component of the reproduced composite signal, and means for producing a frequency reconverting signal supplied to said other frequency converter for causing the latter to convert said relatively lower carrier frequency to said original carrier frequency.

32. Apparatus according to claim 31; in which said original and relatively lower carrier frequencies of the chrominance component are in frequency interleaving relation to each other and to the horizontal synchronizing signal frequency of the video signal.

33. Apparatus according to claim 32; in which said relatively lower carrier frequency has its second harmonic in frequency interleaving relation to said horizontal synchronizing signal frequency of the video signal.

34. Apparatus according to claim 33; in which said relatively lower carrier frequency of the frequency converted chrominance component is selected to satisfy the following equation:

$$f_c = \tfrac{1}{4} f_H (2m-1)$$

in which $f_c$ is said relatively lower carrier frequency, $f_H$ is said horizontal synchronizing signal frequency of the video signal, and m is a whole positive integer.

35. Apparatus according to claim 23; in which said transducer means includes first and second magnetic transducers for recording and reproducing the video signal in said next adjacent tracks, respectively, and said first and second tranducers have gaps with substantially different azimuth angles.

36. Apparatus according to claim 23; in which said video signal is the luminance component of a color television signal comprised of field intervals and predetermined numbers of line intervals included in each field interval and being recorded in respective areas of said successive parallel tracks, and said color television signal further contains a chrominance component; said recording section further includes means for providing different first and second carriers for said chrominance component, carrier selecting means for alternatively selecting the first and second carriers for said chrominance component to be recorded in the tracks, and control means for the carrier selecting means operative to cause the recording of said chrominance component with the first and second carriers therefor, respectively, in said tracks which are next adjacent each other; said transducer means reproduces the frequency modulated luminance component and the chrominance component recorded in each of the tracks along with cross-talk signals from tracks next adjacent thereto; and said reproducing section further includes means for providing the chrominance component reproduced from each of said tracks with a common carrier and for eliminating the cross-talk signals therefrom on the basis of said different first and second carriers with which the chrominance component is recorded in the tracks which are next adjacent each other.

37. Apparatus according to claim 36; in which said means for eliminating the cross-talk signals includes a comb filter.

38. Apparatus according to claim 36; in which said first and second carriers for the chrominance component have different polarity characteristics.

39. Apparatus according to claim 38; in which the polarity of said first carrier for the chrominance component is constant during successive line intervals of the video signals being recorded in one of the tracks, and the polarity of the second carrier for the chrominance component is reversed after each predetermined number of said line intervals of the video signals being recorded in the next adjacent track.

40. Apparatus according to claim 23; in which said transducer means includes first and second magnetic heads alternately traversing the tape at said uniform rate; said drive means selectively drives said tape at a first relatively slow tape speed by which said heads are made to scan overlapping areas on said tape to provide said tracks in abutting relation and with the widths of said tracks being less than the widths of said heads, and at a second relatively fast tape speed by which said tracks are spaced apart to provide guard bands therebetween and the widths of the tracks are equal to said widths of the heads; said means for changing the frequency deviation of the frequency modulated signal includes first and second video signal processing means selectively operative on said video signal in advance of said modulating means for establishing respective gains and sync tip levels for said video signal, and switching means for selectively making operative said first video signal processing means and said second video signal processing means when the tape is driven at said a first and second tape speeds, respectively; and said means to compensate the demodulated signal includes first and second demodulated signal processing means selectively operative on said demodulated signal for restoring the gain and sync tip level of the latter to the original gain and sync tip level of said video signal when the latter has been acted upon by said first and second video signal processing means, respectively, and switching means for selectively making operative said first and second demodulated signal processing means when the tape is driven at said first and second tape speeds, respectively.

41. Apparatus according to claim 40; in which said first and second video signal processing means include respective pre-emphasizing means for applying relatively larger and relatively smaller amounts of pre-emphasis, respectively, to said video signal when the tape is driven at said first and second tape speeds, respectively; and said first and second demodulated signal processing means includes respective de-emphasizing means for applying relatively larger and relatively smaller amounts of de-emphasis, respectively, to said demodulated signal when the tape is driven at said first and second tape speeds, respectively.

42. Apparatus for reproducing a frequency modulated video signal which is recorded in successive parallel tracks on a magnetic tape with the pitch of such tracks and the frequency deviation of the frequency modulated signal being varied in dependence on the one of a plurality of different tape speeds employed during the recording of the frequency modulated video signal on the tape: said apparatus comprising drive means for selectively driving the tape at the one of said plurality of different tape speeds employed during the recording of said signal thereon;

transducer means repeated traversing the tape at a uniform rate so as to scan the successive parallel tracks in which the frequency modulated signal has been recorded for reproducing said signal;

demodulating means for frequency demodulating the frequency modulated signal reproduced by said transducer means from the successive parallel tracks scanned thereby on the tape;

and means operative in dependence on the tape speed at which the tape is driven during the reproducing of the frequency modulated signal by said transducer means to compensate the demodulated signal from said demodulating means for the frequency deviation of the frequency modulated signal corresponding to the respective tape speed.

43. Apparatus according to claim 42; in which the video frequency prior to frequency modulating a carrier is provided with an amount of pre-emphasis which changes in accordance with the speed at which the tape is selectively driven during recording so that said amount of pre-emphasis increases with decreasing tape speed, and further comprising de-emphasizing means acting on said demodulated signal for providing the latter with an amount of de-emphasis which changes in accordance with the speed at which the tape is selectively driven during reproducing so that said amount of de-emphasis increases with decreasing tape speed.

44. Apparatus according to claim 42; in which said means operative to compensate the demodulated signal includes gain-control means acting on said demodulated signal and applying a gain to the latter which is increased when the tape speed is decreased.

45. Apparatus according to claim 44; in which the frequency deviation of the recorded frequency modulated signal is determined, at least in part, by raising the sync tip level of the video signal prior to frequency modulating a carrier therewith when the tape speed for recording is decreased; and in which said means operative to compensate the demodulated signal includes damping means acting on said demodulated signal and lowering the level at which the sync tip level of the demodulated signal is clamped when the tape speed is decreased.

46. Apparatus according to claim 42; in which the frequency modulated signal recorded in tracks which are next adjacent thereto has different first and second carrier frequencies which are in frequency interleaving relation to each other; and further comprising means for eliminating from the demodulated signal the changes in levels thereof corresponding to said different first and second carrier frequencies with which the frequency modulated signal was recorded in the next adjacent tracks, respectively.

47. Apparatus according to claim 42; in which said video signal is the luminance component of a color television signal which further contains a chrominance component having an original carrier frequency, and said chrominance component is frequency converted to a lower frequency band than that of the frequency modulated luminance component and combined with the latter to provide a composite signal which is recorded in said tracks on the tape; and further comprising means for individually separating the frequency modulated luminance component and the frequency converted chrominance component from the reproduced composite signal, and means for frequency reconverting the separated frequency converted chrominance component back to said original carrier frequency therefor.

48. Apparatus according to claim 47; in which said means for frequency reconverting the separated frequency converted chrominance component includes a frequency converter receiving said separated frequency converted chrominance component of the reproduced composite signals, and means for producing a frequency reconverting signal supplied to said frequency converter for causing the latter to convert said relatively lower carrier frequency to said original carrier frequency.

49. Apparatus according to claim 48; in which said original and relatively lower carrier frequencies of the chrominance component are in frequency interleaving relation to each other and to the horizontal synchronizing signal frequency of the video signals.

50. Apparatus according to claim 49; in which said relatively lower carrier frequency has its second harmonic in frequency interleaving relation to said horizontal synchronizing signal frequency of the video signals.

51. Apparatus according to claim 50; in which said relatively lower carrier frequency of the frequency converted chrominance component is selected to satisfy the following equation $$f_c = \tfrac{1}{4} f_H (2m-1)$$

in which $f_c$ is said relatively lower carrier frequency, $f_H$ is said horizontal synchronizing signal frequency of the video signals, and m is a whole positive integer.

52. Apparatus according to claim 42; in which the signals recorded in the next adjacent tracks have different azimuths; and in which said transducer means includes first and second magnetic transducers having gaps with different azimuths corresponding to the azimuths of the signals recorded in the next adjacent tracks and respectively reproducing the signals recorded in the latter.

53. Apparatus according to claim 42; in which said video signal is the luminance component of a color television signal comprised of field intervals and predetermined numbers of line intervals included in each field interval and being recorded in respective areas of said successive parallel tracks, and said color television signal further contains a chrominance component which is recorded with different first and second carriers in said tracks which are next adjacent each other; and in which said transducer means reproduces the frequency modulated luminance component and the chrominance component recorded in each of the tracks along with cross-talk signals from tracks next adjacent thereto; further comprising means for providing the chrominance component reproduced from each of said tracks with a common carrier and for eliminating the cross-talk signals therefrom on the basis of said different first and second carriers with which the chrominance component is recorded in the tracks which are next adjacent each other.

54. Apparatus according to claim 53; in which said means for eliminating the cross-talk signals includes a comb filter.

55. Apparatus according to claim 53; in which said first and second carriers for the chrominance component have different polarity characteristics.

56. Apparatus according to claim 55; in which the polarity of said first carrier for the chrominance component is constant during successive line intervals of the video signal being recorded in one of the tracks, and the polarity of the second carrier for the chrominance component is reversed after each predetermined number of said line intervals of the video signal being recorded in the next adjacent track.

57. Apparatus according to claim 42; in which said transducer mean includes first and second magnetic heads alternately traversing said tape at said uniform rate, said drive means selectively drives said tape at a first relatively slow tape speed by which said heads are made to scan overlapping areas on said tape to provide said tracks in abutting relation and with track widths smaller than the widths of said heads, and at a second relatively fast tape speed by which said tracks are spaced apart to provide guard bands therebetween and track widths equal to said head widths, and the frequency deviations of the frequency modulated signal recorded with the first and second tape speeds, respectively, are determined by establishing respective first and second gains and sync tip levels for the video signal prior to frequency modulating a carrier therewith; and said means to compensate the demodulated signal includes first and second demodulated signal processing means selectively operative on said demodulated signal for restoring the gain and sync tip level of the latter to the original gain and sync tip level of said video signal from said first and second gain and sync tip levels, respectively, and switching means for selectively making operative said first and second demodulated signal processing means when the tape is driven at said first and second tape speeds, respectively.

* * * * *